(12) United States Patent
Joshi et al.

(10) Patent No.: US 11,775,596 B1
(45) Date of Patent: *Oct. 3, 2023

(54) MODELS FOR CLASSIFYING DOCUMENTS

(71) Applicant: Aurea Software, Inc., Austin, TX (US)

(72) Inventors: Ashutosh Joshi, Fremont, CA (US);
Martin Betz, Palo Alto, CA (US);
Rajiv Arora, Gurgaon (IN); Rakesh Kumar Srivastava, New Delhi (IN);
David Cooke, Los Altos, CA (US)

(73) Assignee: Aurea Software, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,482

(22) Filed: Apr. 21, 2022

Related U.S. Application Data

(63) Continuation of application No. 16/691,963, filed on Nov. 22, 2019, now Pat. No. 11,341,194, which is a continuation of application No. 15/662,271, filed on Jul. 27, 2017, now Pat. No. 10,489,441, which is a continuation of application No. 12/772,168, filed on Apr. 30, 2010, now Pat. No. 9,760,634.

(60) Provisional application No. 61/316,824, filed on Mar. 23, 2010.

(51) Int. Cl.
*G06F 16/951* (2019.01)
*G06F 7/08* (2006.01)
*G06F 16/35* (2019.01)

(52) U.S. Cl.
CPC ............ *G06F 16/951* (2019.01); *G06F 7/08* (2013.01); *G06F 16/353* (2019.01)

(58) Field of Classification Search
CPC .............................. G06F 16/951; G06F 16/353
USPC .......................................................... 707/738
See application file for complete search history.

(56) References Cited

U.S. PATENT DOCUMENTS

| | | | |
|---|---|---|---|
| 6,338,057 B1 * | 1/2002 | Weeks | G06F 16/30 707/E17.058 |
| 6,353,827 B1 * | 3/2002 | Davies | G06F 16/313 707/E17.084 |
| 7,181,438 B1 * | 2/2007 | Szabo | G06F 21/6245 705/14.27 |
| 2009/0083251 A1 * | 3/2009 | Sahasrabudhe | G06Q 40/06 707/999.005 |

OTHER PUBLICATIONS

Notice of Allowance dated Jan. 21, 2022, filed in U.S. Appl. No. 16/691,963, pp. 1-4.

(Continued)

*Primary Examiner* — Muluemebet Gurmu

(57) ABSTRACT

Some embodiments provide a method for defining a content relevance model for determining whether a content segment is relevant to a particular category. The method receives a first set of content segments that contain content relevant to the particular category and a second set of content segments that contain content not relevant to the particular category. The method identifies a set of key word sets more likely to appear in the first set of content segments than the second set of content segments. The method defines a content relevance model that comprises a set of groups of word sets and a score for each group, each of the groups of word sets comprising a key word set from the set of key word sets and at least one word set found in a context of the key word set in at least one of the received content segments.

16 Claims, 31 Drawing Sheets

(56) References Cited

OTHER PUBLICATIONS

Terminal Disclaimer Filed on Dec. 16, 2021, filed in U.S. Appl. No. 16/691,963, pp. 1-2.
Terminal Disclaimer Approved on Dec. 16, 2021, filed in U.S. Appl. No. 16/691,963, p. 1.
Response to Non-Final Office Action dated Dec. 9, 2021, filed in U.S. Appl. No. 16/691,963, pp. 1-8.
Non-Final Rejection dated Jul. 9, 2021, filed in U.S. Appl. No. 16/691,963, pp. 1-10.

* cited by examiner 700 715 705 710

Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Anchor sint occaecat cupidatat non proident, sunt in culpa qui officia deserunt mollit anim id est laborum.

Curabitur pretium tincidunt lacus. Nulla gravida orci a odio. Nullam varius, turpis et commodo pharetra, est eros bibendum elit, nec luctus magna felis sollicitudin mauris. Integer in mauris eu nibh euismod gravida. Duis ac tellus et risus vulputate vehicula. Donec lobortis risus a elit. Etiam tempor. Ut ullamcorper, ligula eu tempor congue, eros est euismod turpis, id tincidunt sapien risus a quam.

Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Anchor sint occaecat cupidatat non proident, sunt in culpa qui officia deserunt mollit anim id est laborum. 810

Curabitur pretium tincidunt lacus. Nulla gravida orci a odio. Nullam varius, turpis et commodo pharetra, est eros bibendum elit, nec luctus magna felis sollicitudin mauris. Integer in mauris eu nibh euismod gravida. Duis ac tellus et risus vulputate vehicula. Donec lobortis risus a elit. Etiam tempor. Ut ullamcorper, ligula eu tempor congue, eros est euismod turpis, id tincidunt sapien risus a quam.

*Figure 8*

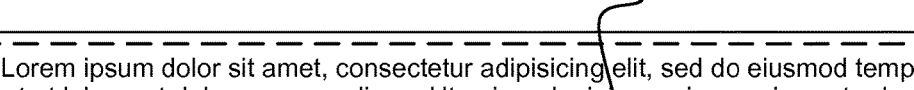

*Figure 9*

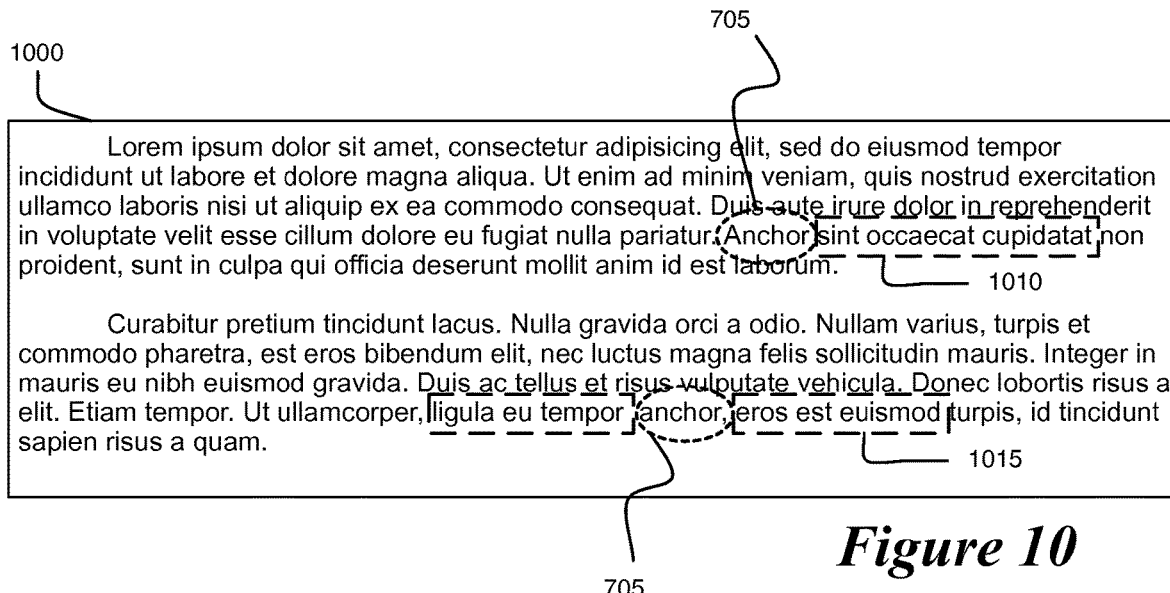
*Figure 10*
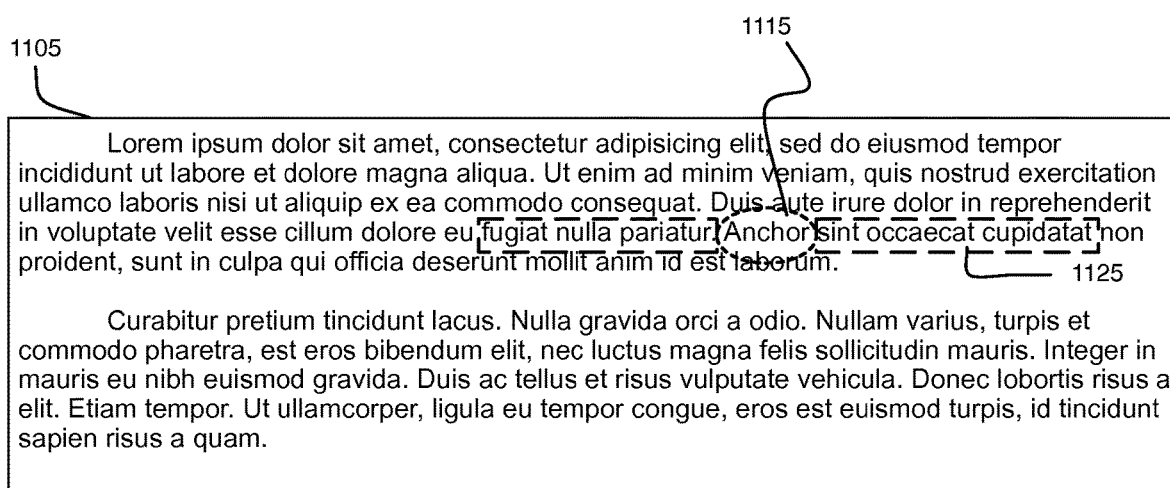
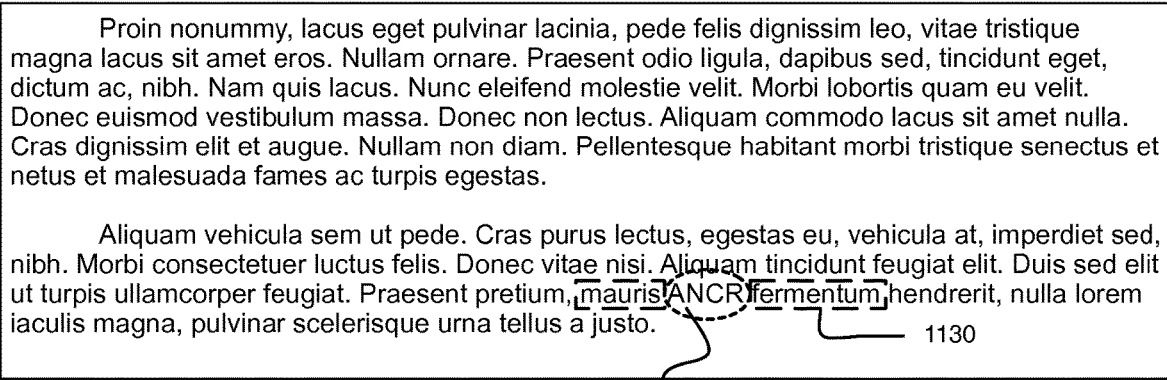
*Figure 11*

| Document ID | Category 1 | Score 1 | Category 2 | Score 2 | Category 3 | Score 3 | ... |
|---|---|---|---|---|---|---|---|
| Document ID 1 | | | | | | | |
| Document ID 2 | | | | | | | |
| Document ID 3 | | | | | | | |
| ... | | | | | | | |
| Document ID N | | | | | | | |

*Figure 30*

| Document ID | Category 1 | Score 1 | Category 2 | Score 2 | Category 3 | Score 3 | ... |
|---|---|---|---|---|---|---|---|
| Document ID 1 | Category A | 14 | Category B | 452 | Category C | 412 | |
| Document ID 2 | Category B | 105 | Category D | 974 | | | |
| Document ID 3 | Category A | 489 | Category E | 434 | Category F | 8 | |
| ... | | | | | | | |
| Document ID N | Category G | 681 | | | | | |

*Figure 31*

| Document ID | Category 1 | Score 1 | Category 2 | Score 2 | Category 3 | Score 3 | ... |
|---|---|---|---|---|---|---|---|
| Document ID 1 | Category A | -47 | Category B | 452 | Category C | 518 | |
| Document ID 2 | Category B | 105 | Category D | 974 | | | |
| Document ID 3 | Category A | 342 | Category E | 433 | Category F | 8 | |
| ... | | | | | | | |
| Document ID N | Category G | 681 | | | | | |

*Figure 32*

MODELS FOR CLASSIFYING DOCUMENTS

CLAIM OF BENEFIT TO PRIOR APPLICATION

This application claims the benefit of U.S. Provisional Application 61/316,824, entitled "Method and System for Document Differentiation", filed Mar. 23, 2010, which is incorporated herein by reference.

BACKGROUND

Most information today is stored electronically and is available on the World Wide Web. This information includes blog posts, articles (e.g., news articles, opinion pieces, etc.), research papers, web pages, and many other types of documents. While having this much information available is useful, it may be very difficult to find information relevant to a particular topic.

Search engines exist today to attempt to find documents on the web that relate to a search string input by the user. However, most search engines base their search on just the words and operators (e.g., "and", "or", etc.) entered by a user. When a user searches for a particular topic, the search engine will only find documents that use the entered word or words, which will lead to many relevant documents being completely overlooked. Such search engines cannot provide a good overview of the documents that surround a particular topic.

BRIEF SUMMARY

Some embodiments of the invention provide a novel method for defining a content relevance model for a particular category (e.g., a company, product, person, topic, etc.) that is used to determine whether a content segment (e.g., a document or portion of a document) is relevant to the particular category. The content relevance model of some embodiments is defined in terms of (i) a set of key word sets more likely to appear in content segments relevant to the particular category and (ii) other word sets within the context of the key word sets.

In order to define such a content relevance model, some embodiments receive (i) a first set of content segments defined as relevant to the category and (ii) a second set of content segments defined as not relevant to the category. The second set of content segments may include content segments relevant to categories related to the particular category but not specifically relevant to the particular category. The method analyzes the two sets of content segments to identify the set of key word sets more likely to appear in content segments relevant to the particular category by identifying word sets that are more prominent in the first set of content segments than the second set of content segments.

The method uses the identified set of key word sets to perform a second analysis on the first and second sets of content segments. Based on a definition of context that may be specific to the particular content relevance model, some embodiments identify a set of groups of word sets (e.g., pairs of word sets, triples of word sets, etc.) that each consist of (i) a first word set from the set of key word sets and (ii) at least one other word set that appears within the context of the key word set in at least one of the received content segments. The method also calculates a score for each group of word sets that quantifies the likelihood that a content segment containing the group of word sets will be relevant to the particular category.

The method defines a content relevance model for the category using (i) the groups of word sets, (ii) the scores for the groups of word sets, and (iii) a set of model parameters. The model parameters of some embodiments include the context definition, a minimum number of key word sets that must be present in a content segment for the content segment to be evaluated for relevance to the category, a default score for newly discovered groups of word sets, or other parameters.

Different embodiments may use different definitions for the context of a key word set. Some embodiments define context by proximity, such that all word sets within a particular number of words of a first word set are within the context of the first word set. Some embodiments define all word sets within the sentence or paragraph of a first word set as within the context of that first word set. In addition, some embodiments allow different definitions of context for different words or different types of content segments.

To develop a content relevance model for a category, some embodiments use a model development application that enables user interaction at various stages of the model development process. For instance, the user may select the first and second sets of content segments that are used to develop the model. From these sets, the application automatically identifies the set of key word sets that are more likely to appear in a content segment relevant to the category and presents the key word sets to the user. The user is then able to determine which of the key word sets should be used for the content relevance model.

The user also can define the context for the key word sets in some embodiments. Once the context is defined and the key word sets selected, the application automatically generates (i) the groups of key word sets and context word sets and (ii) scores for the groups of word sets. Some embodiments enable the user to view the groups and scores. The user may then be able to select which groups of word sets are used in the content relevance model and/or modify the scores. The application then generates the content relevance model for the category, which may be saved as a text file, an XML file, etc.

Once a content relevance model is developed for a particular category, some embodiments use the model to identify new content segments that are relevant to the particular category. To evaluate a new content segment, some embodiments identify key word set-context word set groups from the model in the content segment. Based on the scores in the model for the identified groups of word sets, a relevancy score is assigned to the content segment as a whole. If the content segment's relevancy score is above a certain threshold, the content segment is considered relevant to the particular category.

Some embodiments use the content relevance models in a system that identifies numerous new content segments on a regular basis (e.g., daily) and evaluates those content segments for relevancy to numerous categories. Because evaluation with the context-based content relevance models described above may be a processing-intensive process, some embodiments use a filter for at least some categories that filters out some of the new content segments as clearly not relevant to a category. Only content segments that are potentially relevant to the category are then evaluated by the content relevance model. In some embodiments, the filter used is a simpler content relevance model that does not use word pairs and is less processing-intensive.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIGS. 7-11 illustrate anchor words and their context words in a document according to some embodiments.

FIGS. 30-32 illustrate a database and the modifications made to the database when the documents are put through the two-model process shown in FIG. 29.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method for defining a content relevance model for a particular category that is used to determine whether a content segment is relevant to the particular category. The content relevance model of some embodiments is defined in terms of (i) a set of key word sets more likely to appear in content segments relevant to the particular category and (ii) other word sets within the context of the keywords.

In some embodiments, the content relevance models are used within a system that evaluates numerous (i.e., thousands) new content segments for relevance to numerous different categories on a regular basis. Some such systems have a content relevance model defined for every category. The categories may be companies (e.g., Microsoft, Intel, General Motors, etc.), products (e.g., Bing, Xbox, Windows 7, etc.), people (e.g., Bill Gates, Steve Ballmer, etc.), industries or product types (e.g., automobiles, search engines, operating systems, etc.), concepts (e.g., housing trends, etc.) or any other category about which users of the system may want to research.

The content segments, in some embodiments, are text documents or portions of documents. Some embodiments also analyze audio or video content (e.g., by using an audio to text converter), or other types of content. Much of the description below uses the term 'document' to refer to the content segments being analyzed. One of ordinary skill will recognize that the processes described below may equally apply to other types of content.

Figure 1:
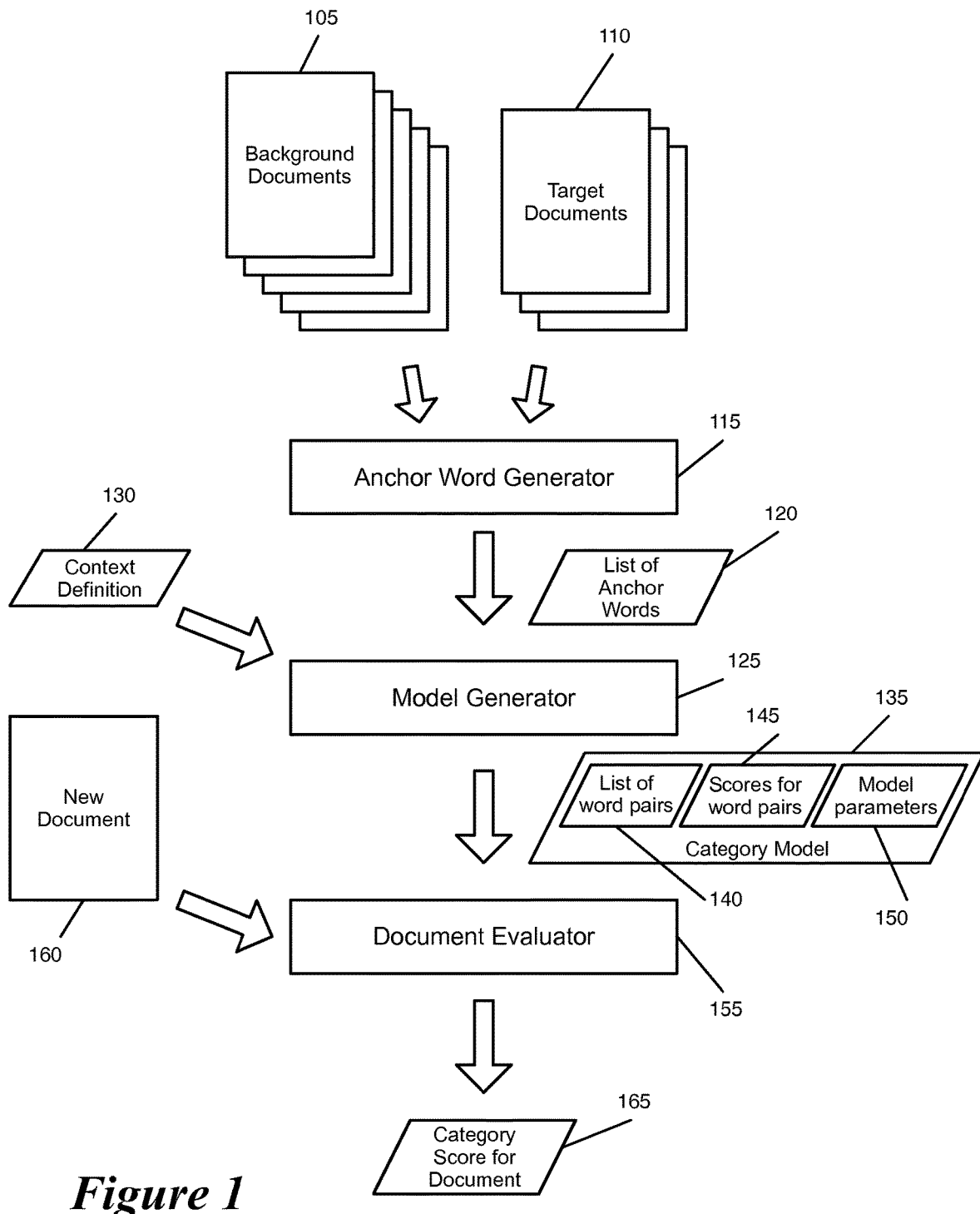
FIG. 1 conceptually illustrates the overall flow of a method for defining and using a content relevance model according to some embodiments.

FIG. 1 conceptually illustrates the overall flow of a method for defining and using such a content relevance model according to some embodiments. As shown, a background document set 105 and a target document set 110 are input into an anchor word generator 115. The documents in background document set 105 are documents that are defined as being not relevant to the category for which the content relevance model is being developed, while the documents in target document set 110 are documents that are defined as being relevant to the category. Ideally, the content relevance model should give high scores to new documents the content of which most resembles that of the documents in the target document set 110 while being different from that of the documents in the background document set 105.

The anchor word generator 115 identifies a set of anchor words or phrases (i.e., keywords) that are more likely to appear in target set documents than in background set documents. The anchor words are scored by anchor word generator 115 in some embodiments, with higher scores based on a higher likelihood of appearance in the target set documents. Some embodiments compute a score for a particular word based on the relative probabilities of the particular word appearing in the background and target document sets and the number of appearances of the word in the target document set. As shown in the figure, the anchor word generator outputs a list of anchor words 120.

The list of anchor words 120 from the anchor word generator 115 is input to a model generator 125 along with the background and target document sets 105 and 110 and a context definition 130. The context definition 130 is used by the model generator 125 to identify pairs of words in the background and target documents. Each pair consists of (i) a first word from the list of anchor words and (ii) a second word that is within the context of the first anchor word.

Different embodiments may use different definitions for the context of a word from the first set. Some embodiments define context by proximity, such that all words within a particular number of words of a first word are within the context of that first word. Some embodiments define all words within the sentence or paragraph of a first word as within the context of that first word. In addition, some embodiments allow different definitions of context for different words or different types of content segments.

The model generator 125 also calculates a score for each word pair that quantifies the likelihood that a document that contains the word pair will be relevant to the category for which the content relevance model is being developed. In some embodiments, the score for a particular word pair is dependent on a comparison between the number of occurrences of the word pair and the number of occurrences of the anchor word in the word pair in each of the two sets of input documents.

The model generator 125 outputs a content relevancy model 135 for the category. As shown, the content relevancy model includes (i) a list of word pairs 140, (ii) scores for the word pairs 145, and (iii) model parameters 150. The model parameters of some embodiments include the context definition, a minimum number of anchor words that must be present in a new document for the document to be evaluated for relevance to the category, a default score for newly discovered word pairs, or other parameters. A newly discovered word pair, in some embodiments, occurs when a word appears in a new document in the context of an anchor word to form a word pair that is not in the list of word pairs 140. Some models ignore such new word pairs while other models assign a default score.

As noted, some embodiments use the content relevance models to identify new documents that are relevant to various categories. FIG. 1 illustrates that document evaluator 155 uses the model 135 to evaluate a new document 160 in order to generate a category relevance score 165 for the document. In some embodiments, the document evaluator 155 searches for anchor words in the new document 160 and then uses the context definition from the model to identify all of the word pairs in the new document 160. The word pairs in a new document are defined in the same way as the word pairs in the target and background documents, in that each word pair consists of (i) an anchor word and (ii) a word within the context of the anchor word.

The category relevance score 165 for the new document is calculated based on the scores 145 from the model for the word pairs identified in the new document. In some embodiments, the category relevance score is the arithmetic mean of the scores for the word pairs identified in the new document. Other embodiments calculate the category relevance score as a sum, median, or other function of the scores for the identified word pairs. Based on the score 165, the document can be classified as either relevant or non-relevant to the particular category.

As mentioned above, some embodiments use the content relevance models in a system that identifies new documents on a regular basis and evaluates the new documents for relevancy to numerous categories. To identify the new documents, some embodiments crawl the Internet on an ongoing basis to search for new documents. In such a system, the number of documents evaluated may be on the order of half a million new documents a day, which are evaluated by fifty thousand or more models in some embodiments.

Because evaluation using the context-based content relevance models may be a processing-intensive process, some embodiments use a filter for at least some of the categories. A filter of some embodiments for a particular category filters out some of the new documents as being clearly not relevant to the particular category, so that only documents that might be relevant to the category are evaluated by the context-based content relevance model. In some embodiments, the filter used is a simpler content relevance model that does not use word pairs and is less processing-intensive.

Furthermore, some embodiments update the content relevance models on a regular basis to incorporate any new terms that may indicate relevancy to a particular category (e.g., a new product may indicate relevancy to the company that produces it). Some embodiments use any new documents classified as relevant to the particular category as a new target document set and the original target document set 110 as a new background document set in order to identify any new keywords more likely to appear in the newer documents than the older documents. Using some or all of these new keywords as additional anchor words, the model is regenerated with the original target and background document sets, and the new documents as additional target documents.

Much of the description above and in the following sections is described in terms of words and word pairs. One of ordinary skill will recognize that sets of words (e.g., single words, stem words, phrases, compound words, or other sets) may be used as keywords (i.e., anchor words) in some embodiments. Furthermore, while most of the description describes identifying and using word pairs, groups of more than two words (or more than two word sets) could be identified and used in the models of some embodiments. For example, evaluating a document could involve finding a key word set and multiple word sets within the context of the key word set.

Several more detailed embodiments of the invention are described in the sections below. Section I provides a description of the model development process of some embodiments, including an application with which a user interacts to develop the model. Section II then describes uses of the models once they are developed, while Section III describes the software architecture of a system of some embodiments in which the models are used. Finally, Section IV describes a computer system which implements some embodiments of the invention.

I. Developing a Model for a Category

As described above, some embodiments develop a content relevance model for a particular category by identifying anchor words, identifying word pairs and scores for the word pairs based on a context definition, and generating a model using the word pairs, scores, and a set of model parameters.

The model can then be used to determine whether new documents are relevant to the category.

Figure 2:
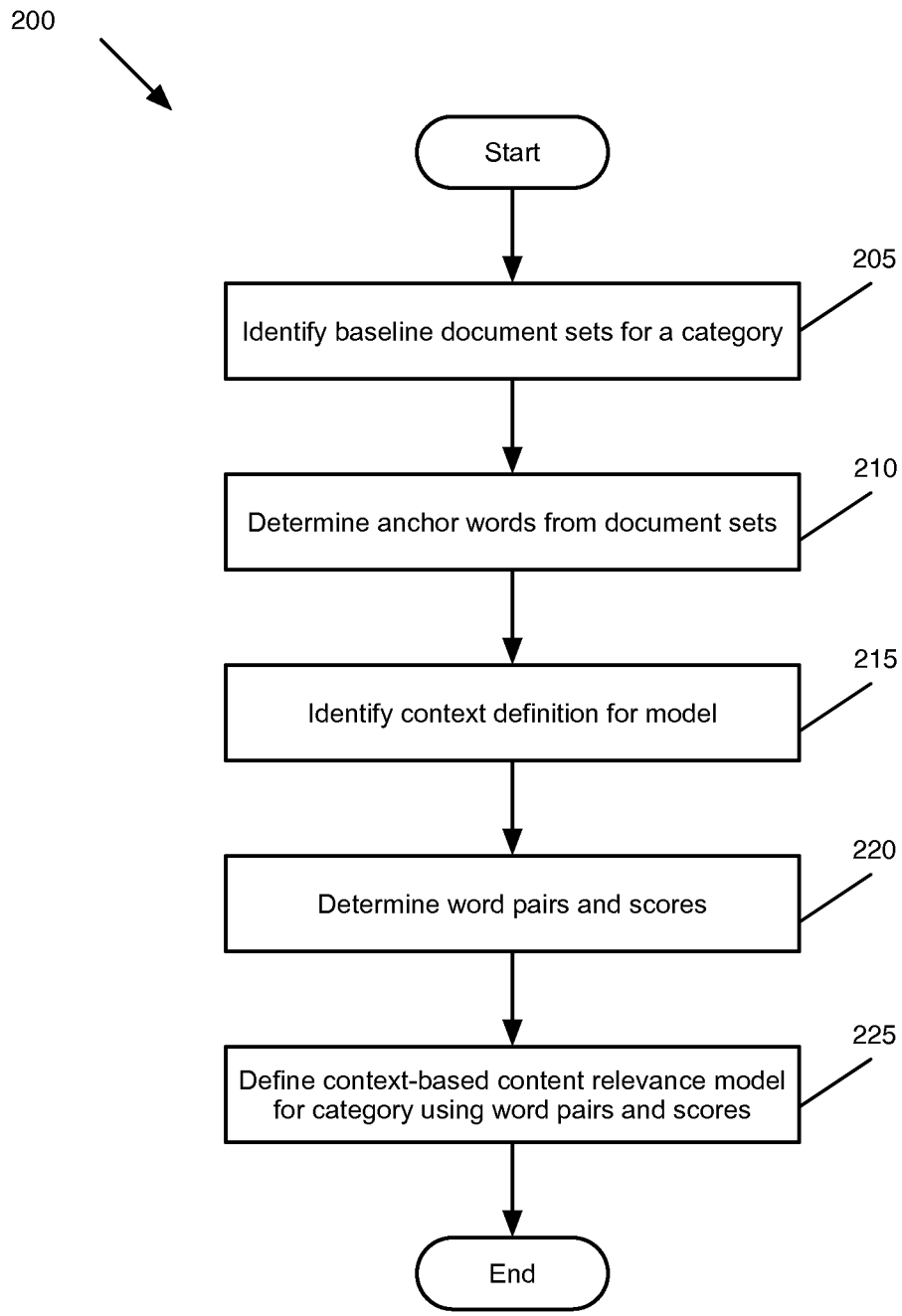
FIG. 2 illustrates a process of some embodiments for developing a model.

FIG. 2 illustrates a process 200 of some embodiments for developing such a model. The process begins by identifying (at 205) baseline document sets for a category. In some embodiments, these baseline document sets are a target document set that contains documents considered relevant to the category and a background document set that contains documents considered not relevant to the category. The process then determines (at 210) anchor words from the identified document sets. In some embodiments, these anchor words are words that are more likely to be found in the target set than the background set, or are a subset of such words.

The process 200 next identifies (at 215) a context definition for the model. In some embodiments, the context definition is a parameter of the model that determines when a second word is within the context of an anchor word. The context may be a particular number of words from the anchor word or the same sentence or paragraph as the anchor word in different embodiments. With the context defined, the process determines (at 220) word pairs and scores for the word pairs. In some embodiments, each word pair includes one of the anchor words and another word within the defined context of the anchor word. The score for a particular word pair, in some embodiments, quantifies the likelihood that a document containing the word pair is relevant to the particular category.

Finally, the process 200 defines (at 225) a context-based content relevance model for the category using the word pairs and scores. The content relevance model can then be used to determine whether new documents are relevant to the particular category. In some embodiments, the content relevance model includes the word pairs and scores and a set of model parameters, including the context definition.

In the remainder of this Section, subsection A describes the identification of anchor words, subsection B describes the identification of word pairs and scores to generate a model, and subsection C describes an application that can be used to develop such a model.

A. Identifying Anchor Words

The first part of developing a model for a particular category is to identify anchor words. In some embodiments, these are words that are more likely to appear in a document that relates to the particular category as compared to a document that does not relate to the category. For instance, the name of the category may also be an anchor word in some cases.

Figure 3:
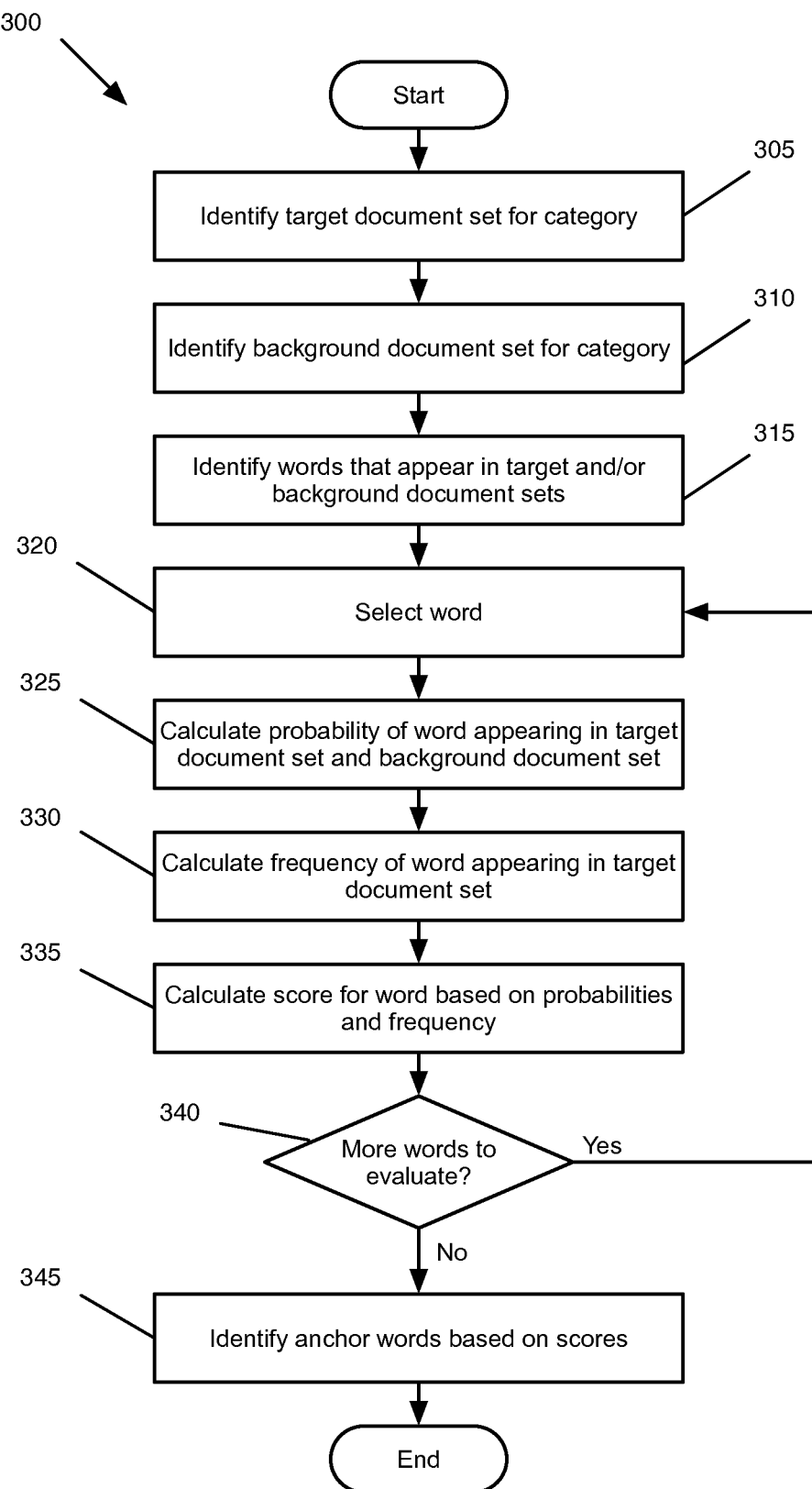
FIG. 3 conceptually illustrates a process of some embodiments for identifying anchor words for a category model.

FIG. 3 conceptually illustrates a process 300 of some embodiments for identifying anchor words for a category model. In some embodiments, process 300 is an automated process that receives background and target documents as input and then automatedly outputs anchor words for use in the model.

As shown, process 300 begins by identifying (at 305) a target document set and (at 310) a background document set for the category. In some embodiments, a user (i.e., a topic developer whose job it is to develop category models) enters a list of documents from one or more sources for each document set. For instance, a user may enter the text of a document, a uniform resource locator (URL) specifying where the document is located on the world wide web, a file address on the user's computer, etc. Some embodiments enable a user to enter a category for which documents are already classified. For example, a user developing a model for the "Twitter" category might wish to use all documents that are related to the "Facebook", "Google", or "social networking" categories as background set documents, because these would include many documents that are about categories close to Twitter but not actually about Twitter.

One of ordinary skill in the art will recognize that operations 305 and 310 need not be performed in the particular order shown. That is, the background documents could be identified before the target documents, or the documents could all be identified at the same time. For instance, as shown below in subsection C, some embodiments enable a user to enter the documents for both categories and then upon receipt of a particular input will analyze the documents.

Once the two sets of documents are identified, the process identifies (at 315) words that appear in any of the documents in the target and background sets. In some embodiments, these words are stored in a storage (e.g., volatile storage such as RAM or non-volatile storage such as an internal or external hard disk, permanent or removable solid-state memory, etc.). The identified words may be stored in any of a number of storage structures, such as an array, a database, etc.

Some embodiments employ a filtering process to remove certain words from the stored list of words. For instance, some embodiments remove articles (e.g., "the", "a", "an"), prepositions (e.g., "of", "from", "to", etc.), conjunctions (e.g., "and", "or"), etc. In linguistic analysis terms, stop words (words that have minimal searchable meaning) are removed. Some embodiments remove all words of a particular length or shorter (e.g., three letters), though other embodiments do not remove short words because of the usefulness of certain acronyms, proper nouns, or other words.

Some embodiments are able to identify compound words as one word rather than two. For instance, it might be more useful to have the term "cloud computing" identified as a single word rather than the separate terms "cloud" and "computing". In order to identify such compound words, some embodiments store a list of such compound words and scan the document for the terms in the list. Other embodiments will note if two words appear together more than a particular threshold number of times in a single document or document set, and concatenate the words into a single compound word when this is the case.

Some embodiments will also identify multi-word phrases as a single word without concatenating the phrases into one compound word. For example, for the category of "cloud computing" the phrase "sharing of resources" might be a phrase that is useful as a single keyword. Some embodiments find multi-word phrases by identifying phrases that appear together more than a particular number of times in a single document or document set and are not in a list of compound words.

Furthermore, some embodiments identify stem words (generally represented by a partial word followed by an asterisk). When the stem word is found to start a word in a document, that is considered an instance of the stem word regardless of the letters that come after the partial. For instance, each of the words "engineered", "engineer", and "engineering" would be identified as instances of the word "engineer*". Some embodiments store a list of such stem words and identify a word as both an instance of the full word (i.e., engineering) and an instance of the stem word (i.e., engineer*).

The process 300 then selects (at 320) one of the identified words. In some embodiments, the words are arranged alphabetically or in some other particular order, while in other embodiments the words are selected randomly. The process then performs a variety of calculations in order to generate a score for the selected word.

The process calculates (at 325) the probability of the word appearing in the target document set and the background document set. In some embodiments, the probability of the word appearing in a particular set of documents is the number of appearances of the word in the document set divided by the number of total words in the document set. Thus, the probability will be calculated as the same whether a word appears fifty times in one document or ten times in each of five documents in a set. As indicated, the probability is calculated for each word for both the target and background document sets.

The process also calculates (at 330) the frequency with which a word appears in the target document set. In some embodiments, this frequency is the number of total appearances of the word in the target document set. This is also the numerator in the probability calculation described above.

As with the identification of the target and background document sets, one of ordinary skill will recognize that different embodiments can perform these calculations in different orders. For instance, some embodiments will perform the target set calculations together, calculating both probability and frequency either before or after calculating the probability for the background set. Other embodiments will perform all of the calculations in parallel.

The process 300 then calculates (at 335) a score for the word based on the calculated probabilities and frequency. In some embodiments, the score for a particular word is proportional to the frequency of the word appearing in the target document set (or a function thereof) and the difference between the probabilities (or a function thereof). For instance, some embodiments use the following equation:

$$\text{Score}(w) = 100 * \left( \frac{P(w \mid T) - P(w \mid B)}{P(w \mid T)} \right) * \log(F(w \mid T))$$

In this equation, P(w|S) is the probability of a word w appearing in a particular set S. As described above, this probability is the number of appearances of the word in the set divided by the number of total words in the set. F(w|S), as described above, is the number of total appearances of the word w in the document set S.

Thus, a word will have the same score whether the word appears many times in one document in the target set or the same number of times but scattered throughout the target document set. Any word that does not appear at all in the background document set will have a score of 100 from the first portion of the above equation, because the P(w|B) variable will have a value of zero. However, because this is multiplied by the logarithm of the number of word appearances, a word that appears only once in the target set will have a low score while a word that appears many times will have a much higher score.

The function above for scoring a potential anchor word is only one of numerous possible functions that are used by different embodiments. For instance, other embodiments may take into account the number of documents in a set in which the word appears, giving more weight to words that appear in multiple documents in the target set as compared to words that appear many times in only one target set document. The same equation as shown above could be used, except that the variable P(w|S) is the number of documents in set S in which the word w appears divided by the total number of documents in the set S, and/or F(w|S) is the total number of documents in the set S in which the word w appears. Some embodiments could also use a combination of the number of total occurrences of the word w in the set S and the number of documents in the set in which the word appears.

After the score is calculated for the selected word, process 300 determines (at 340) whether more words remain for evaluation. When more words remain, the process returns to 320 to select the next word and calculate a score for the word. Once all of the words have been evaluated, the process identifies (at 345) anchor words for the category model based on the scores. Some embodiments automatically select a set number of words with the highest score as anchor words (e.g., the top fifteen words), or all words above a particular score threshold. Other embodiments present a set number of words or all words above a threshold to a user, who then selects the anchor words that should be used. This technique may be used to weed out anomalies that should not be used as anchor words. The process then ends.

Figure 4:
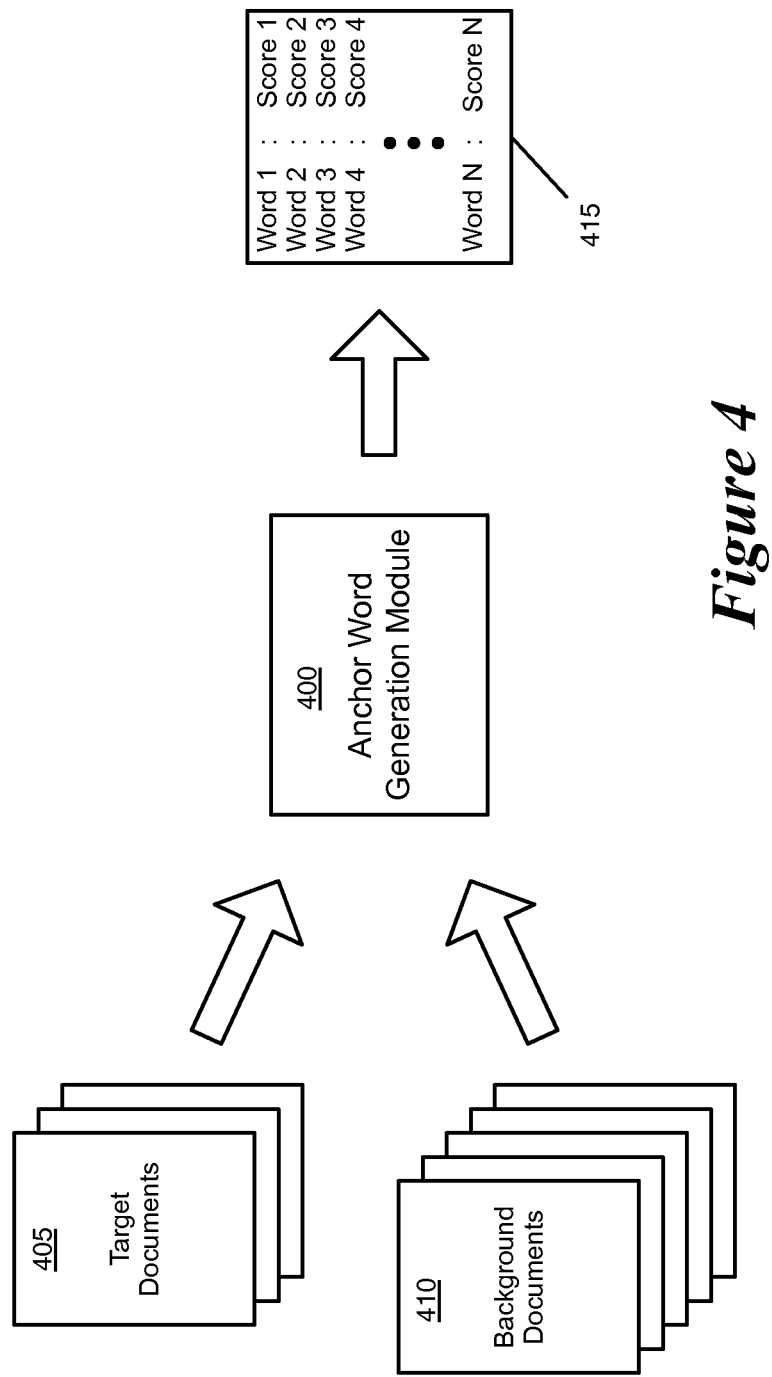
FIG. 4 illustrates the input and output of an anchor word generation module of some embodiments.

FIG. 4 illustrates the input and output of an anchor word generation module 400. Target documents 405 and background documents 410 are input to the anchor word generation module 400. In some embodiments, module 400 performs process 300. The output of anchor word generation module is a set of words and scores 415. In some embodiments, this data 415 is stored in a database, array, or other storage structure.

Figure 5:
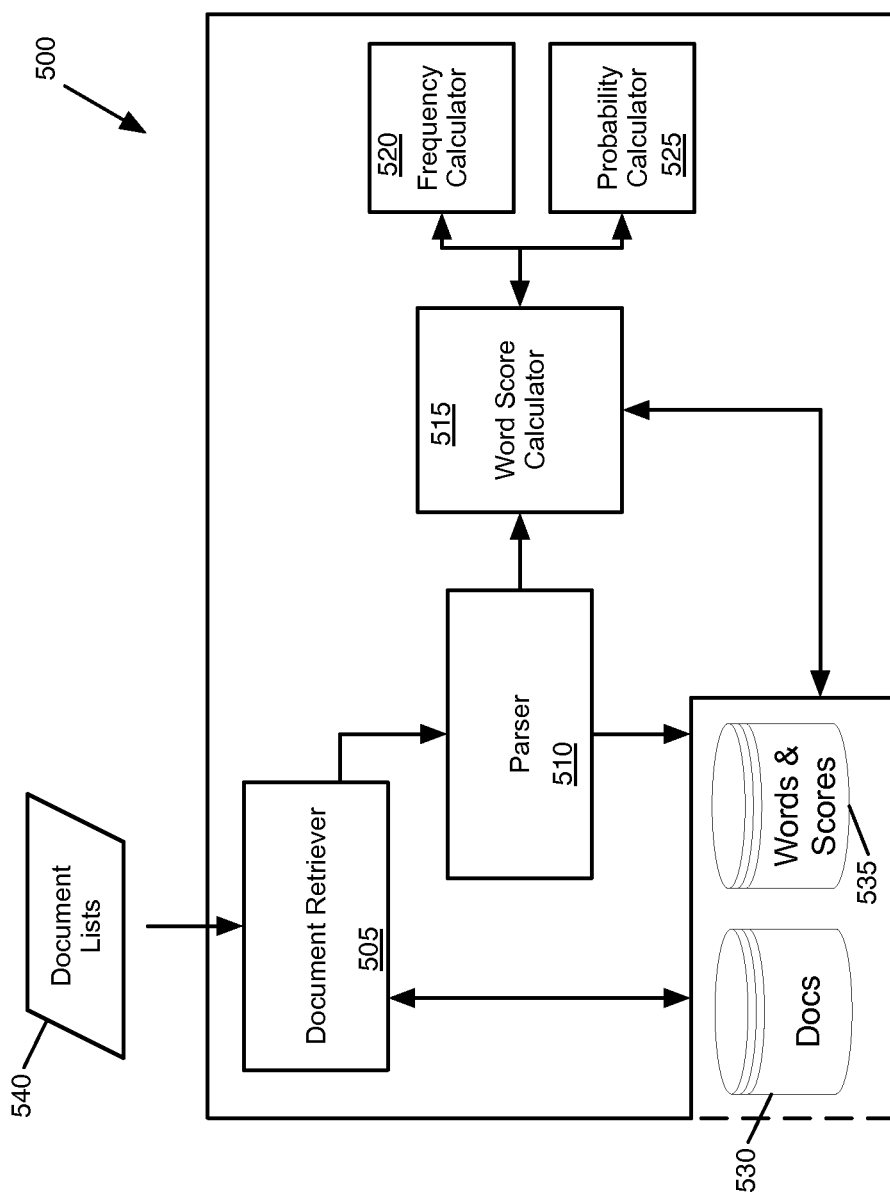
FIG. 5 conceptually illustrates the software architecture of an anchor word generation module of some embodiments.

FIG. 5 conceptually illustrates the software architecture of an anchor word generation module 500 of some embodiments. The anchor word generation module 500 shown in this figure is one example of a module that receives target and background document sets and outputs a list of anchor words with scores, as illustrated in FIG. 4. The module 500 may perform process 300 in some embodiments.

The anchor word generation module 500 includes a document retriever 505, a parser 510, a word score calculator 515, a frequency calculator 520, and a probability calculator 525. FIG. 5 also illustrates a document storage 530 and a word and score database 535. In some embodiments, storages 530 and 535 are one physical storage. In other embodiments, the documents and words/scores are stored in separate physical storages.

The document retriever 505 receives lists of target and background documents (e.g., that are input by a user), and retrieves the documents from storage 530. The parser 510 parses each of the documents to identify all of the words in the document, and stores the list of words for each document in the database 535.

The word score calculator 515 retrieves document and word information (e.g., a list of the words in each document) from the storages 530 and 535 and/or from parser 510. The word score calculator 515 calculates a score for each word in the documents and stores that score in the database 535. In calculating a score, the word score calculator 515 makes calls to the frequency calculator 520 and the probability calculator 525.

The frequency calculator 520 calculates the frequency of each word's appearance in one or both of the document sets. The probability calculator 525 calculates the probability of each word's appearance in one or both of the document sets. In some embodiments, the probability calculator makes a call to the frequency calculator, the data from which it uses in calculating the probability.

The operation of anchor word generation module 500 will now be described. The document retriever 505 receives document list data 540 from an external source. This may be directly from user interface interaction or from another module. The document retriever retrieves the specified documents from the storage 530 and sends the retrieved documents to the parser 510. In some embodiments, when the document list specifies a URL for a document, the document retriever 505 retrieves the document from the external URL via the Internet. The parser 510 parses the documents to identify the words in the documents and stores this information in database 535.

The word score calculator 515 then receives the word data from the parser 510 or retrieves that data from the database 535, and calculates scores for the words (e.g., using the equation shown above). In making this calculation, the word score calculator 515 makes use of the frequency calculator 520 and probability calculator 525.

As noted above, this is only one example of an anchor word generation module. Different embodiments that use different equations to calculate word scores will have different sub-modules of the anchor word generation module. Furthermore, the flow of data may be different (e.g., data could be sent directly from the parser 510 to the word score calculator 515 without being stored in the database).

B. Identifying and Scoring Word Pairs to Define a Model

Once the anchor words have been determined for a particular category, word pairs can be identified and assigned a score. In some embodiments, a word pair consists of an anchor word and a context word. As described below, the context of an anchor word may be defined in a variety of ways. The score for a word pair is an indication as to the likelihood of the particular word pair appearing in a document that is relevant to the particular category. The word pairs and scores are used to define a model for evaluating new documents for relevancy to the category.

Figure 6:
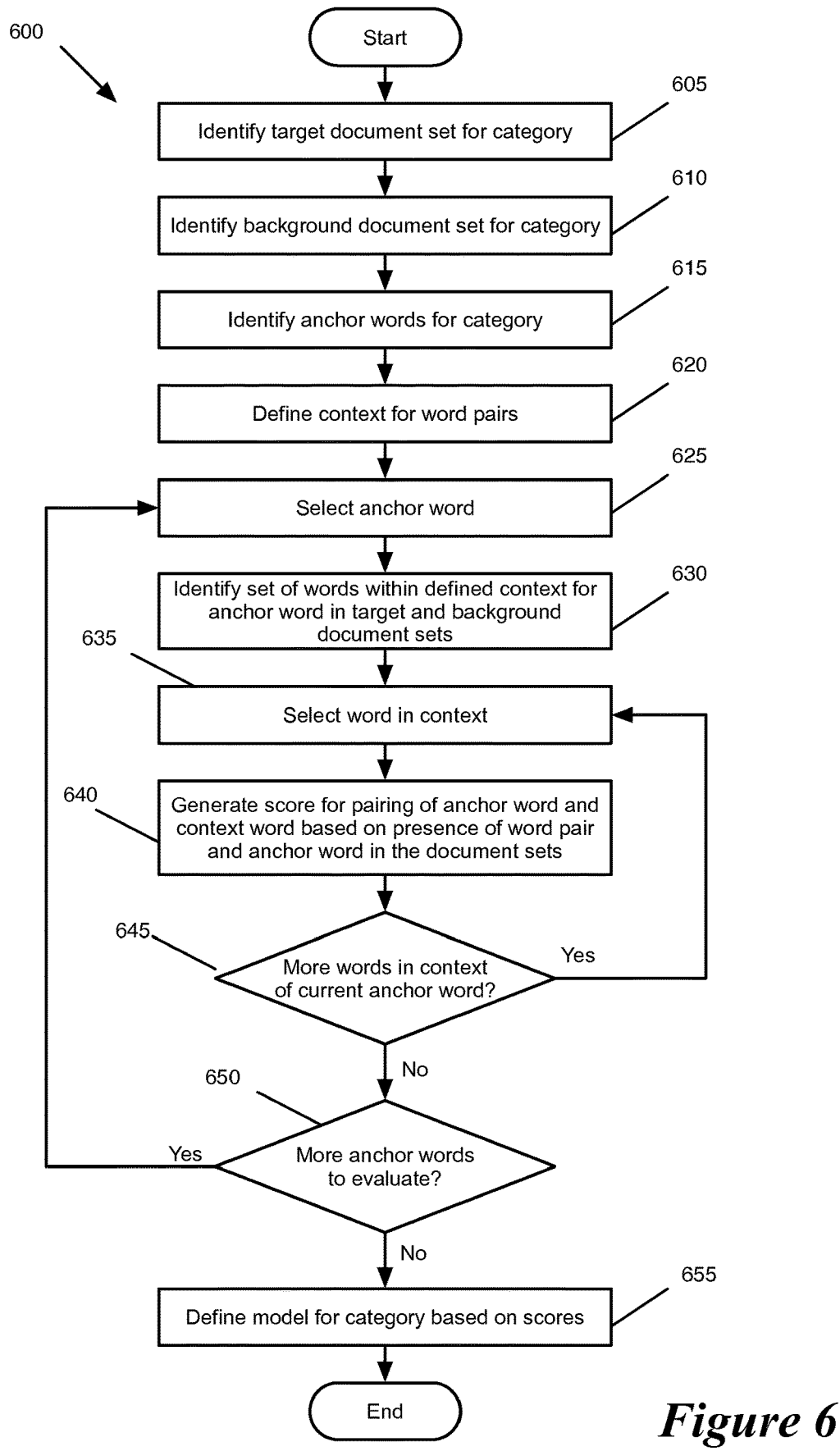
FIG. 6 conceptually illustrates a process of some embodiments for defining a model for a document category once anchor words have been determined.

FIG. 6 conceptually illustrates a process 600 of some embodiments for defining a model for a document category once anchor words have been determined (e.g., by process 300). In some embodiments, process 600 is an automated process that receives background and target document sets, a list of anchor words, and a context definition as input and then automatically outputs a model that includes a list of word pairs with scores.

In some embodiments, processes 300 and 600 are concatenated into one automated process. Target and background document sets and a context definition are received as input and the process calculates scores for the words in a document, automatically selects a set of anchor words, generates word pairs and scores for the word pairs, and then defines a model. Other embodiments, though, require user intervention at certain points (e.g., to select the anchor words from a list).

As shown, process 600 begins by identifying (at 605) a target document set and (at 610) a background document set for the category. In some embodiments, these are the same target and background document sets as are used to generate the list of anchor words. As described above, these documents are entered by a user as URLs, text, etc. In some embodiments, a user enters the document lists once before generating the anchor words, and process 600 automatically uses those target and background documents to define a model.

The process then identifies (at 615) the anchor words for the category. As mentioned, these may be selected by a user or selected automatically based on scores. The process also defines (at 620) a context for word pairs. One of ordinary skill in the art will recognize that operations 605-620 need not be performed in the particular order shown. The process 600 may receive all of the input data (documents, anchor words, and context definition) at once, or in an order different from that shown in FIG. 6.

The context defined for the word pairs at 620 specifies which words in a document can form a word pair with the anchor word. For example, the context may be defined in terms of proximity to an anchor word—e.g., all words within five words of the anchor word. The context may also be defined based on the sentence or paragraph structure, such that a word pair is formed between an anchor word and each other word in the same sentence or paragraph as the anchor word. A combination of the above is also possible, in which the context is defined as all words within a particular number of words of the anchor word and also in the same sentence as the anchor word.

In some embodiments, the context may be defined differently for different models. This may be based on empirical results. That is, a user may evaluate a model for a category by using the model to evaluate various documents that are either relevant or non-relevant to the category. If many of the documents are misclassified, the user may modify the context definition and regenerate the model. By doing so, the user may determine that one context (e.g., a proximity of five words around an anchor word) is appropriate for a first model while a second context (e.g., a proximity of three words around an anchor word) is appropriate for a second model.

The context may also be document-driven in some embodiments. A document-driven context definition, in some embodiments, is a context definition for a model that seeks to use different contexts for anchor words in different types of documents. For instance, a user might notice that when the company name "Microsoft, Inc." is used, primarily in specific types of publications, it tends to be surrounded by meaningful context words in a seven-word area. On the other hand, when the shorthand form "MSFT" is used, primarily in market reports or blogs, it tends to have a much smaller meaningful context area of three words on either side. Accordingly, the user could define different contexts (e.g., different size proximities) for the different anchor words "Microsoft, Inc." and "MSFT". Some embodiments enable a user to determine the type of document based on the words present (or other factors, such as the source) and set a context definition for all anchor words in the document based on the determination of document type.

After identifying all of the inputs, the process 600 selects (at 625) one of the identified anchor words. Some embodiments select the anchor words in alphabetical order, while other embodiments select the anchor words based on their score (e.g., as calculated by process 300). Still other embodiments select the anchor words randomly.

The process next identifies (at 630) the set of words within the defined context for each instance of the anchor word in the target and background document sets. As described above, the sets of words within the context of an anchor word will vary based on how the context is defined. FIGS. 7-11 illustrate such sets of words for different context definitions.

FIG. 7 illustrates a portion of a document 700 that includes an anchor word 705, "Anchor". In this situation, the context for the model that is being developed and for which the document 700 is an input is defined as being three words on either side of the anchor word. As shown, the set of context words 710 for the anchor word 705 includes six words 710.

FIG. 8 illustrates the same portion of document 700 including anchor word 705. In this situation, though, rather than the context for the anchor word defined in terms of proximity to the anchor word, the context is defined as all other words in the same sentence as the anchor word. As such, the sixteen words in the remainder of the sentence are all included in the set of context words 810 for the anchor word 705.

FIG. 9 again illustrates the same portion of document 700 with anchor word 705. In the situation illustrated in this figure, the context for the anchor word is defined as all other words in the same paragraph as the anchor word. As such, the set of context words 910 for the anchor word 705 includes sixty-three words (sixty-seven words total, four of which are duplicates of other words).

FIG. 10 illustrates a portion of a document 1000 that includes the anchor word 705 twice. In this situation, the context is defined as three words on either side of the anchor word so long as the word is also in the same sentence as the anchor word. Because the first instance of the anchor word 705 starts a sentence, only the three words after that instance are in the set of context words 1010 for that instance. On the other hand, the second instance of anchor word 705 is in the middle of its sentence, so its set of context words 1015 includes six words, three on either side.

FIG. 11 illustrates portions of two documents 1105 and 1110. The first document 1105 is a first type of document that includes the anchor word 1115, while the second document 1110 is a second type of document that includes the anchor word 1120. Based on the presence of anchor word 1115 in document 1105, the context definition for document 1105 is a proximity of three, such that the set of context words 1125 for anchor word 1115 includes six words. On the other hand, based on the presence of anchor word 1120 in document 1110, the context definition for document 1115 is a proximity of one word on either set of the anchor words. As such, the set of context words 1130 for anchor word 1120 includes only two words.

In some embodiments, the identified word pairs are stored in a storage (e.g., volatile storage such as RAM or non-volatile storage such as an internal or external hard disk, permanent or removable solid-state memory, etc.). The identified words may be stored in any of a number of storage structures, such as an array, a database, etc.

Some embodiments use a filtering process on the context words so that not all words are joined into word pairs with the selected anchor word. For instance, some embodiments remove articles (e.g., "the", "a", "an"), prepositions (e.g., "of", "from", "to", etc.), conjunctions (e.g., "and", "or"), etc. Some embodiments remove all words of a particular length or shorter (e.g., three letters), though other embodiments do not remove short words because of the usefulness of certain acronyms, proper nouns, or other words. Additionally, as with anchor words, some embodiments are able to identify compound words as one word rather than two.

Returning to FIG. 6, the process 600 next selects (at 635) one of the context words for the selected anchor word. For instance, referring to FIG. 7, the process would select one of the six words in the set of context words 710, unless the anchor word 705 appears elsewhere in the document, in which case one of the context words for that instance of the anchor word could also be selected. Some embodiments select the context words in alphabetical order, while others select the words randomly. In some embodiments, the context words are ordered based on their appearance in the document set (i.e., the documents are parsed in a particular order, and within each document the words are in an order).

The process then generates (at 640) a score for the word pair of the current anchor word and context word. In some embodiments, this score is based on the frequency of the context word appearing within the context of the anchor word (i.e., the word pair appearing together) in the target and background document sets as well as the frequency of the anchor word's appearance in the target and background document sets. Some embodiments utilize the following equations to calculate a score for a word pair:

$$S(w_1, w_2) = 100 * (F(w_1, w_2 \mid T)) - (F(w_1, w_2 \mid B)),$$

in which $$F(w_1, w_2 \mid S) = \frac{coocF(w_1, w_2 \mid S)}{marF(w_1 \mid S)} * \frac{coocD(w_1, w_2 \mid S)}{marD(w_1 \mid S)}$$

In these equations, $coocF(w_1, w_2 \mid S)$ is the number of occurrences in which $w_2$ is in the context of $w_1$ (the anchor word) in the document set S (either the target document set T or the background document set B), while $marF(w_1 \mid S)$ is the number of occurrences of the anchor word in the document set S (i.e., the margin of the anchor word in the document set). Similarly, $coocD(w_1, w_2 \mid S)$ is the number of documents in which the word pair appears while $marD(w_1 \mid S)$ is the number of documents in which the anchor word appears.

Thus, the function $F(w_1, w_2 \mid S)$ above will give a high score to a word pair that appears often in a document set on a relative scale compared to the frequency of the anchor word in the document set. Because the anchor words are chosen to be words that appear relatively often in the target document set, the situation in which an anchor word appears only once and thus all of its word pairs get a very high score will be avoided.

In general, the function $S(w_1, w_2)$ will be higher for word pairs that are likely to appear in a document relevant to the category for which a model is being developed and unlikely to appear in non-relevant documents. This function is only one of numerous possible functions that are used by different embodiments to assign a score for a word pair. For instance, other embodiments may take into account only the relative number of occurrences of the word pair between the background and target document sets, or may take into account additional variables such as the relative occurrences of the context word on its own in the background and target document sets.

After the score is generated for the selected word pair, the process 600 determines (at 645) whether there are any more context words for the currently selected anchor word (i.e., whether there are any more word pairs to score for the current anchor word). When more context words remain, the process returns to 635 to select the next context word and generate a score for the word pair.

Otherwise, the process 600 determines (at 650) whether more anchor words need to be evaluated and have scores generated for their word pairs. When more anchor words remain, the process returns to 625 to select the next anchor word and generate scores for the word pairs of the anchor word with each of its context words.

When all of the anchor words have been evaluated, the process defines (at 655) a model for the category based on the scores. In some embodiments, the model includes a set of model parameters (e.g., the context definition and other parameters), and a set of word pairs matched with scores. An example of a model is described below by reference to FIG. 14. The process then ends.

Some embodiments automatically include all word pairs in the model. This may include word pairs with high positive scores (more likely to appear in a document related to the category) as well as word pairs with high negative scores (more likely to appear in a document unrelated to the category). Some embodiments present a list of all of the word pairs with scores to a user (i.e., developer of the category model), and the user can select or deselect word pairs to include in the model.

Figure 12:
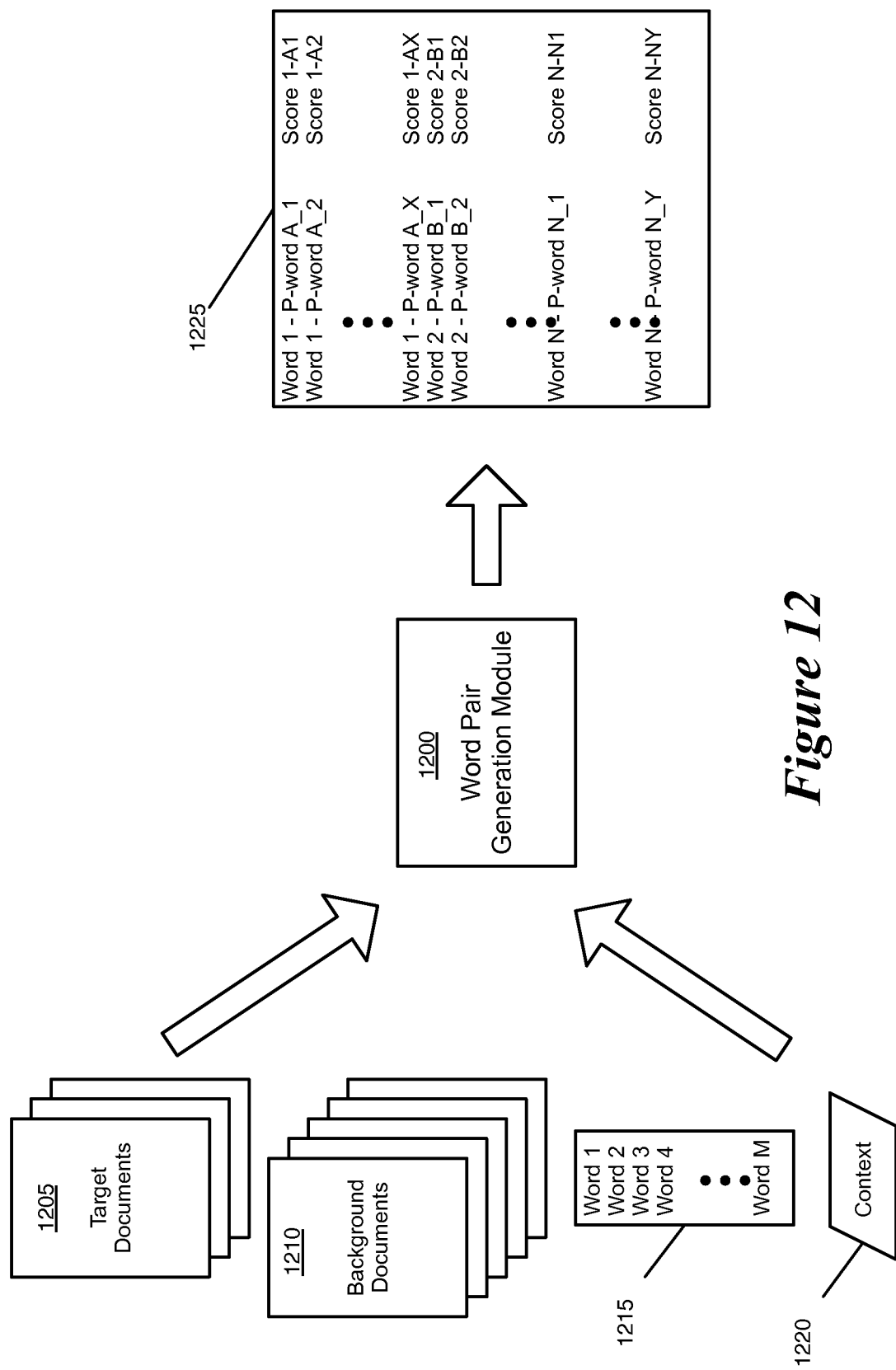
FIG. 12 illustrates the input and output of a word pair generation module of some embodiments.

FIG. 12 illustrates the input and output of a word pair generation module 1200. Target documents 1205, background documents 1210, a set of anchor words 1215, and a context definition 1220 are input to the word pair generation module 1200. In some embodiments, module 1200 performs some or all of process 600. Using these inputs, the word pair generation module 1200 generates and outputs a set of word pairs and scores 1225. As shown, the set 1225 includes numerous word pairs for each of the anchor words.

Figure 13:
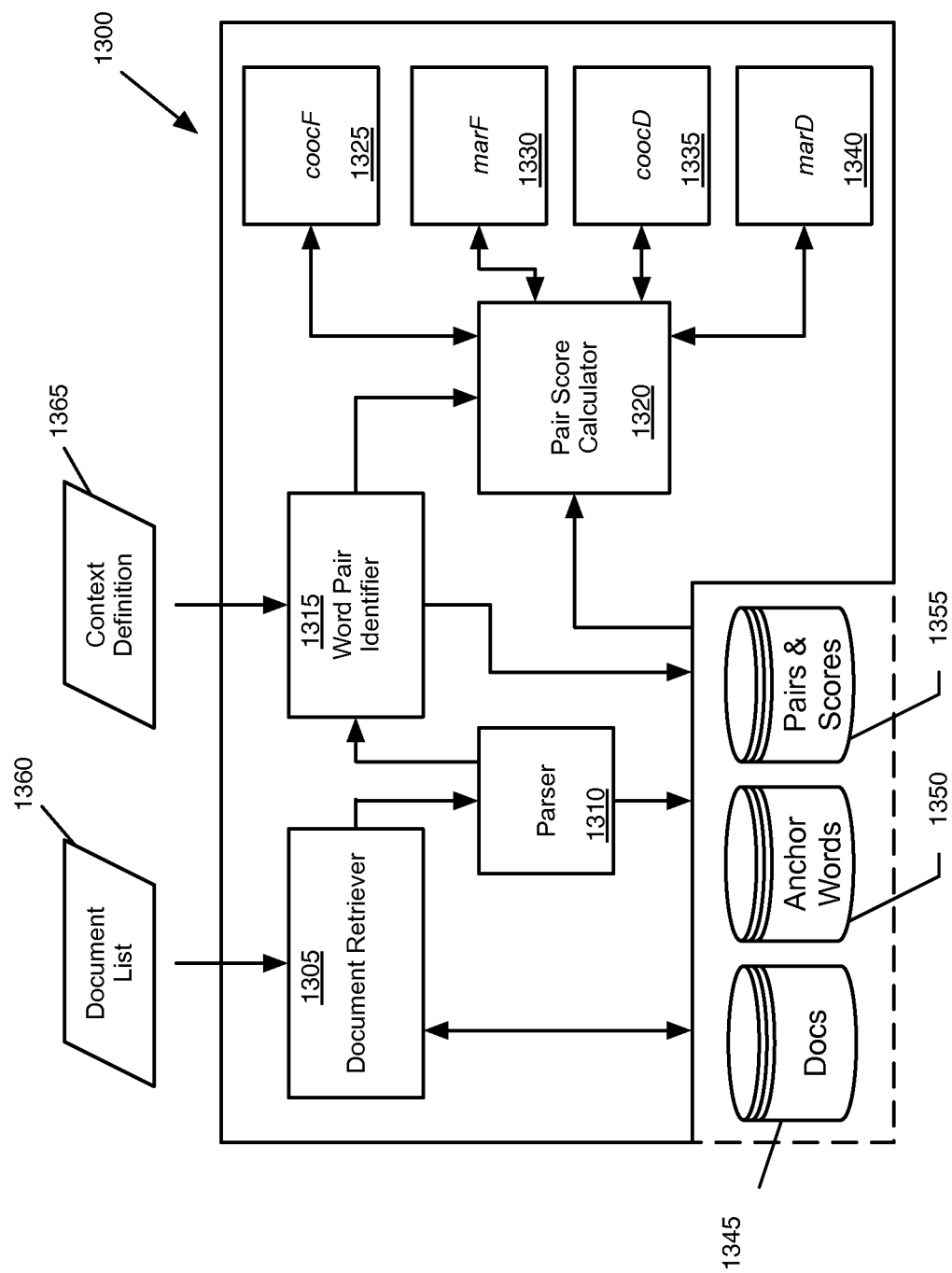
FIG. 13 conceptually illustrates the software architecture of a word pair generation module of some embodiments.

FIG. 13 conceptually illustrates the software architecture of a word pair generation module 1300 of some embodiments. The word pair generation module 1300 shown in this figure is one example of a module that receives target and background documents, anchor words, and a context definition and uses this input to output word pairs with scores for use in defining a model, as illustrated in FIG. 12. The module 1300 may perform process 600 in some embodiments.

The word pair generation module 1300 includes a document retriever 1305, a parser 1310, a word pair identifier 1315, a pair score calculator 1320, and four function modules coocF 1325, marF 1330, coocD 1335, and marD 1340. FIG. 13 also illustrates a document storage 1345, an anchor word database 1350, and a pairs and scores database 1355. In some embodiments, storages 1345-1355 are one physical storage. In other embodiments, all three may be in different physical storages, or may be split between two storages. For instance, some embodiments store the anchor words database 1350 and the pairs and scores database 1355 together. In some embodiments, these are even stored in one database. Furthermore, some embodiments may split one of the illustrated storages across numerous physical storages (e.g., there may be so many documents that numerous storages are required to store copies of all of them).

The document retriever 1305 receives lists of target and background documents (e.g., that are input by a user), and retrieves the documents from storage 1345. The parser 1310 parses each of the documents to identify all of the words in the document, and stores the list of words for each document in the database 1350. In some embodiments, because the target and background document sets are the same as are received from a user, data from the parser is already stored and the document retriever 1305 and parser 1310 are not used.

The word pair identifier 1315 retrieves document and anchor word information from the storages 1345 and 1350 or from the parser 1310. The word pair identifier uses a received context definition to identify all the context words for each anchor word and stores the identified word pairs in the storage 1355.

The pair score calculator 1320 retrieves document and word information from the word pair identifier 1315 and/or the storages 1345-1355. The pair score calculator 1320 calculates a score for each word pair identified by module 1315. In calculating these scores, the pair score calculator 1320 makes calls to the function modules 1325-1340.

The coocF module 1325 calculates the number of appearances of a particular word pair in a particular document set. The marF module 1330 calculates the number of appearances of a particular anchor word in a particular document set. The coocD module 1335 calculates the number of documents in a particular document set in which a particular word pair appears. The marD module 1340 calculates the number of documents in a particular document set in which a particular anchor word appears. One of ordinary skill will recognize that various different embodiments will use different function modules depending on the scoring function used. The function modules shown in FIG. 13 are those used to calculate the functions shown above in this section.

The operation of the word pair generation module 1300 will now be described. The document retriever 1305 receives document list data 1360 from an external source. This may be directly from user interface interaction or from another module. The document retriever retrieves the specified documents from the storage 1345 and sends the retrieved documents to the parser 1310. The parser 1310 parses the documents to identify all of the words in the document and stores this information in the storages.

The word pair identifier 1315 then receives this word data from the parser or retrieves the data from the storages along with the anchor words from database 1350. In some embodiments, the word pair identifier may receive the word data from an external module such as anchor word generator 500 of FIG. 5. The word pair identifier 1315 also receives a context definition 1365 from an external source (e.g., directly from user interface interaction or from another module). The word pair identifier identifies all of the context words for each anchor word and stores the word pairs in database 1355.

The pair score calculator 1320 then receives the word pairs from the word pair identifier 1315 or retrieves the pairs from the database 1355, and calculates scores for the pairs (e.g., using the equation above). In performing this calculation, the pair score calculator 1320 makes use of the various function modules 1325-1340.

As noted above, this is only one example of a word pair generation module. Different embodiments that use different equations to calculate word pair scores will have different sub-modules of the word pair generation module. Furthermore, the flow of data may be different (e.g., data could be sent directly from the parser 1310 to the pair score calculator 1320 without going through either the storages or the word pair identifier 1315).

Figure 14:
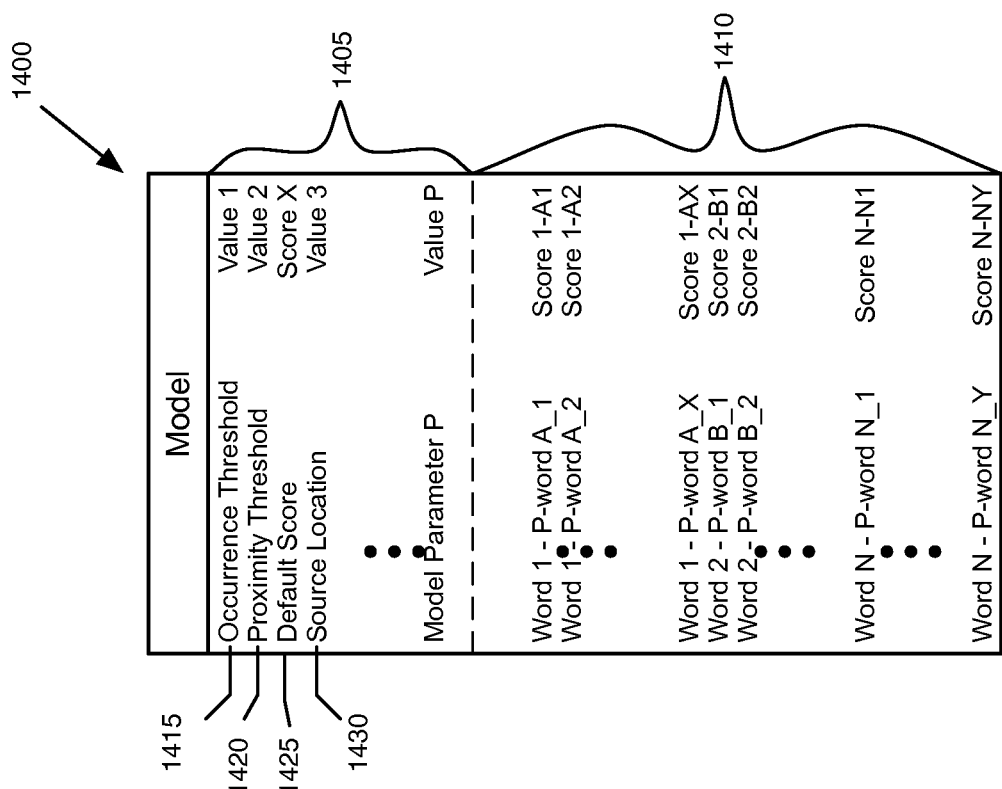
FIG. 14 illustrates an example of a model of some embodiments.

As noted above, once word pairs are generated and scored for a category a model can be defined for the category. The model may be stored as a file in some embodiments (e.g., a text file, an XML file, etc.). FIG. 14 illustrates an example of such a model 1400 of some embodiments. The model 1400 includes two sections—a parameters section 1405 and a word pairs section 1410. The word pairs section 1410 includes a list of word pairs and the scores of those word pairs.

The model parameters section 1405 includes a variety of parameters used to define how the model will evaluate new documents. The parameters shown in FIG. 14 include an occurrence threshold 1415, a proximity threshold 1420, a default score 1425, and a source location 1430.

The occurrence threshold 1415 is a parameter included in some embodiments that defines a minimum number of anchor words that must appear in a document in order for the document to be evaluated as potentially relevant to the category. When the number of anchor words is below the occurrence threshold, some embodiments assign the lowest possible score (e.g., −9999) to the document and do not perform any further evaluation of the document.

The proximity threshold 1420 is one example of a context definition. Just as the context definition is required in the development of the model, it is also used to identify word pairs in a new document that is being evaluated for relevance to the category using the model. While model 1400 includes a proximity threshold (how close a word has to be to an anchor word to be considered a context word), other models may include other context definitions as described above.

The default score 1425 is a score that is assigned to a new word pair that is not found in the model. That is, when a word is found in the context of an anchor word in a new document, and that word was not in the context of any instance of the anchor word in either the target or background document sets used to develop the model, the word pair is assigned the default score. Some embodiments set the default score to the twenty-fifth percentile score for all of the word pairs in the model, or some other statistical property of the scores in the model. Other embodiments use a default score of zero or another value. Some embodiments allow the user (i.e., model developer) to define the default score for a model.

The source location parameter 1430 is a parameter included in some models that identifies when an anchor word might actually be a source for an article and not actually part of the words of the document itself. For instance, in a model for the News Corp. category, "Wall Street Journal" might be one of the anchor words. However, certain documents from the Journal may have the words "Wall Street Journal" as part of the source information. The source location parameter may specify a value that represents the number of words from the beginning of the document within which an anchor word may actually be a source (e.g., 50 words). Some embodiments also specify the particular anchor word or words which may appear as sources and automatically discard any appearances of that anchor word within the source location. Some embodiments provide more specific details of the surrounding terms or characters (e.g., commas, colons, dates, locations, etc.). When the specific surroundings for the anchor word are present, the anchor word is discarded.

Other parameters may also be included in the model definition. For instance, some embodiments run documents through a less computationally intensive pre-filtering model to reduce the number of documents that have to be evaluated with the model described above. The pre-filtering model assigns a score to each document in some embodiments, and the model definition of model 1400 may include a minimum score threshold for evaluation.

C. Application for Developing a Model

The above subsections A and B describe the processes involved in developing a model (i.e., identifying anchor words using background and target document sets and then identifying word pairs and scoring those word pairs in order to define the model). As noted, in some embodiments the model is developed using an application through which the user can input the target and background documents, select anchor words from a list of candidates, define the context and other parameters for the model, etc. Some embodiments also allow a user to evaluate the model using test documents to determine whether the model correctly evaluates new documents. FIGS. 15-25 illustrate various aspects of the user interface of such a model development application, from the initial definition of a category through evaluation of test documents.

Figure 15:
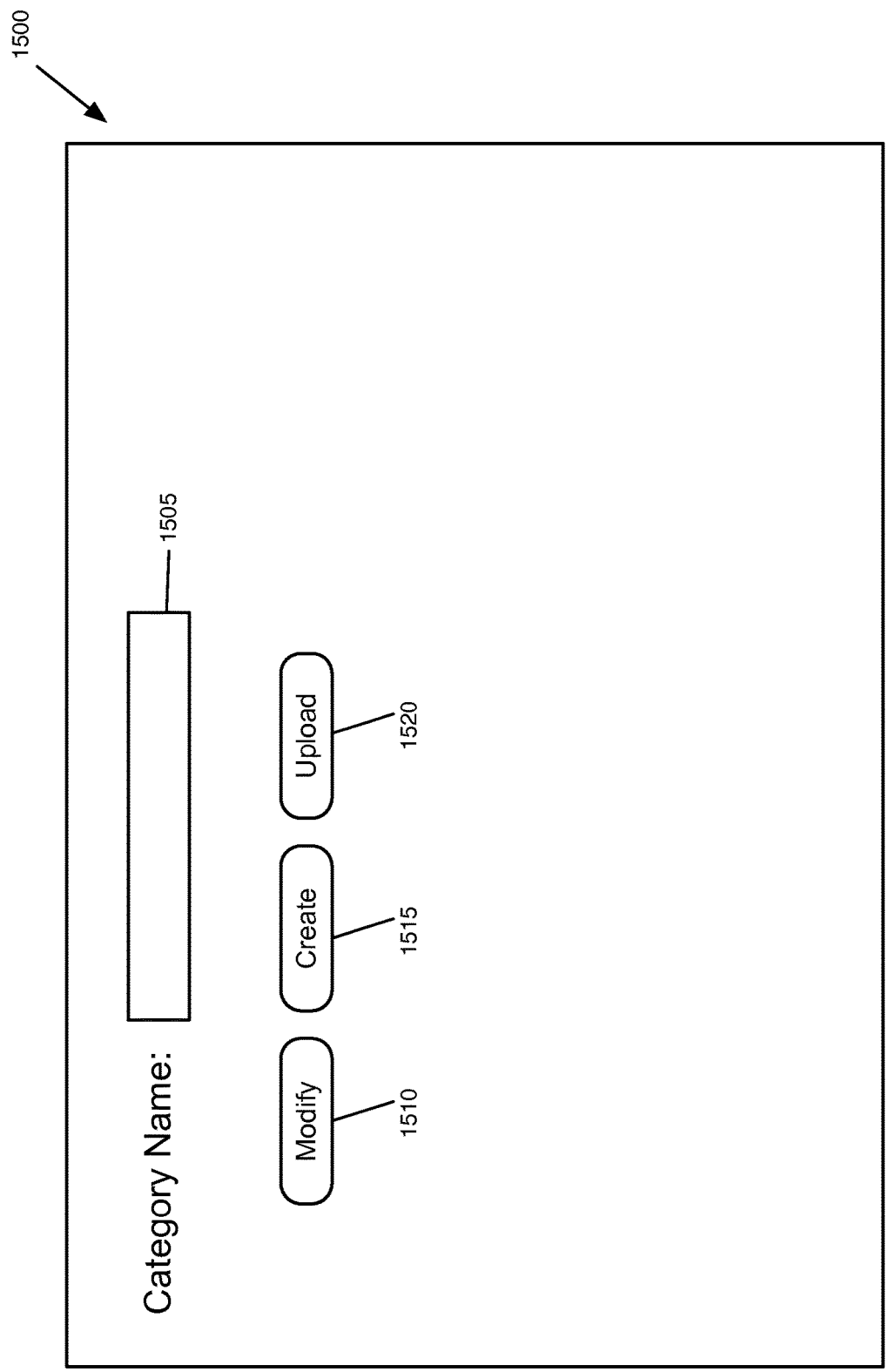
FIGS. 15 and 16 illustrates a user interface that is presented when a model development application is started in some embodiments.

FIG. 15 illustrates a user interface 1500 that is presented when the model development application is started in some embodiments. The user interface 1500 includes a category name field 1505 and three selectable items 1510-1520. The selectable items are shown as buttons, but could be any sort of selectable items between which a user can choose via a mouse click or similar user interface interaction (e.g., touch-screen interactions).

Figure 16:
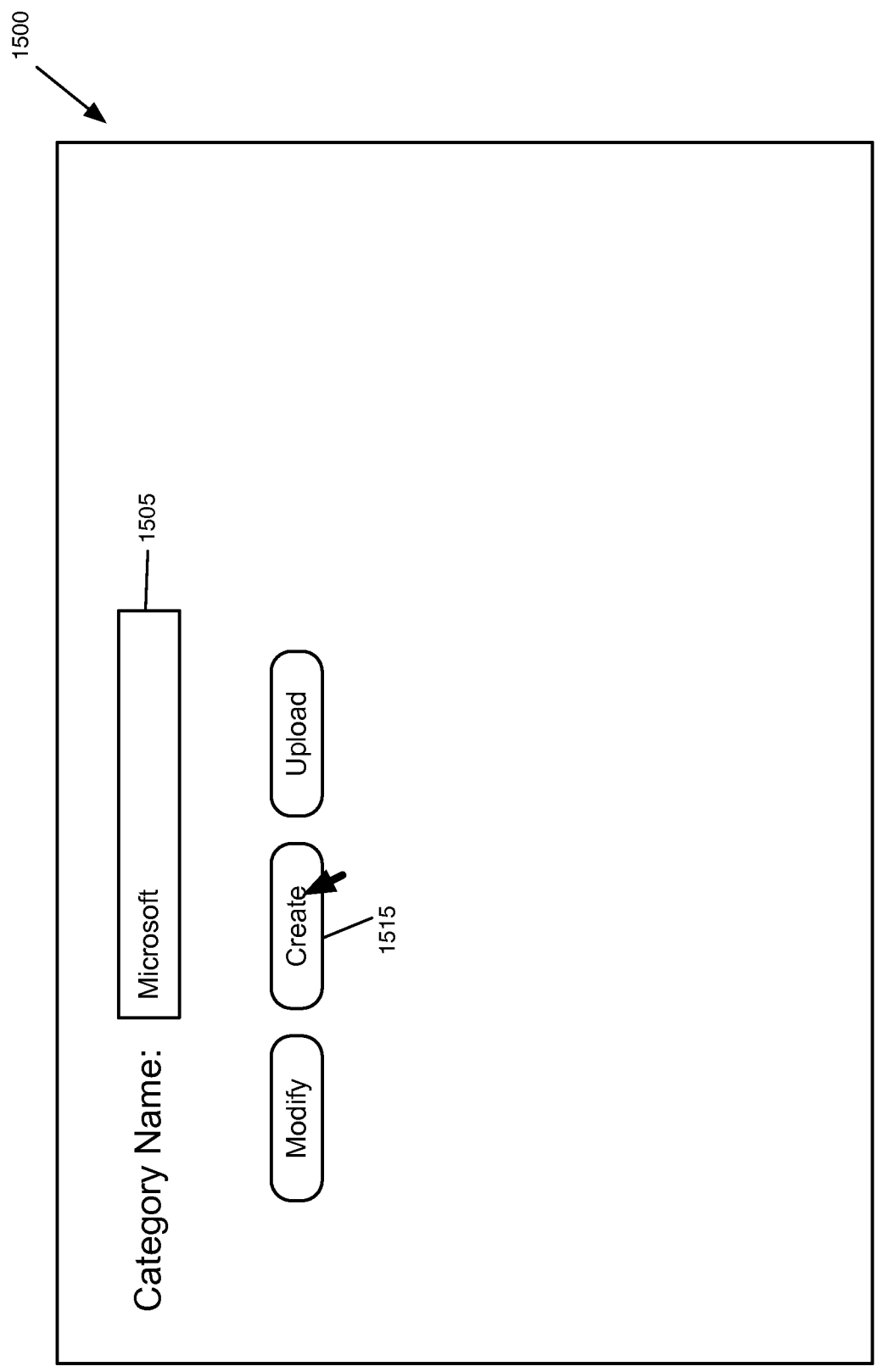

The category name field 1505 allows a user to type or otherwise enter (e.g., copy and paste) a name for a category. This may be a new category for which a model is to be created or an already existing category for which a model is to be modified. FIG. 16 illustrates user interface 1500 a user has entered the word "Microsoft" into the category name field 1505 in order to develop a model for the company Microsoft.

The "Modify" selectable button 1510 enables a user to modify an existing model. The user may want to evaluate the model, add new documents to the target or background sets used to develop the model, select different anchor words or word pairs, etc. The "Create" selectable button 1515 allows a user to create a new model for an entered category. The "Upload" selectable button 1520 allows a user to upload various files, such as a model file to be modified, target and background document sets, and/or evaluation documents. The three options presented in user interface 1500 are only examples of the types of options that various embodiments may provide to the user. For instance, some embodiments would include a menu that allows a user to jump directly to various different screens in the model development process.

In the example shown in FIG. 16, after typing "Microsoft", the user has placed a cursor over the "Create" button 1515 in order to begin developing a new model for the Microsoft category. In some embodiments, this brings up a screen that enables a user to enter background and target documents for use in developing the new model.

Figure 17:
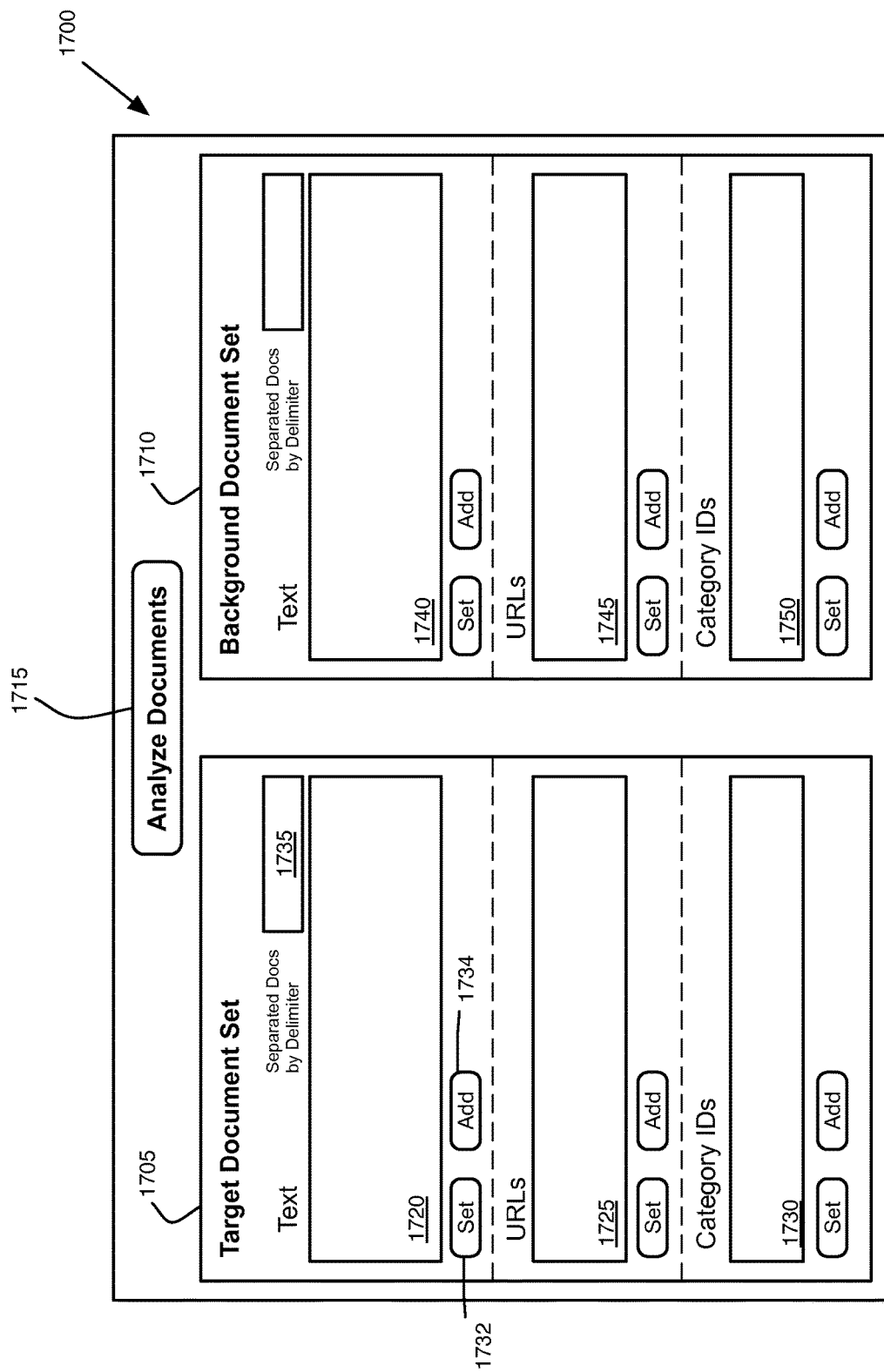
FIGS. 17 and 18 illustrates a user interface for entering documents for the target and background sets.

FIG. 17 illustrates a user interface 1700 for entering documents for the target and background sets. In some embodiments, the user interface 1700 is presented when a user selects the "Create" button 1515 from user interface 1500 or a similar command to begin developing a model. User interface 1700 includes a target document set entry form 1705, a background document set entry form 1710, and an "Analyze Documents" selectable item 1715.

The target document set entry form 1705 includes three entry fields: a text entry field 1720, a URL entry field 1725, and a category ID entry field 1730. The text entry field allows a user to enter the text of one or more documents (e.g., by copying and pasting from the document). In order to identify when one document ends and the next starts, a delimiter is used. This delimiter is entered (e.g., typed) into the delimiter field 1735 and then also entered between the documents in field 1720.

The URL entry field 1725 allows a user to enter various Uniform Resource Locators (URLs) at which documents are located on the World Wide Web (WWW). In some embodiments, users can also use this field to enter disk locations (e.g., C:\ . . . ) at which document files are located. The category ID entry field 1730 allows a user to enter the names of categories from which documents will be pulled. That is, when the user enters a category name in the field 1730, documents that are considered relevant to that category will be used for the target document set.

The "Set" and "Add" selectable user interface items 1732 and 1734 are present in user interface 1700 in some embodiments to allow a user to modify the documents in a particular set. When a user is modifying a model, he can use the "Set" button 1732 to replace a document set or portion of a document set with new documents. For instance, the user could enter new text into text entry field 1720 and select button 1732. Previously entered text documents in the target document set would then be replaced with the newly entered text documents. In some embodiments, the user may use the "Add" button 1734 to add documents to the original document set. If the user enters new text into text entry field 1720 and selects button 1734, the newly entered text documents would be added to the target document set without deleting the previously entered text documents.

The background document set entry form 1710 includes the same three fields as the target document set entry form 1705: a text entry field 1740, a URL entry field 1745, and a category ID entry field 1750. In many cases, the user will enter specific target documents into text and URL entry fields 1720 and 1725, and then use category ID entry field 1750 for the background set documents.

Figure 18:
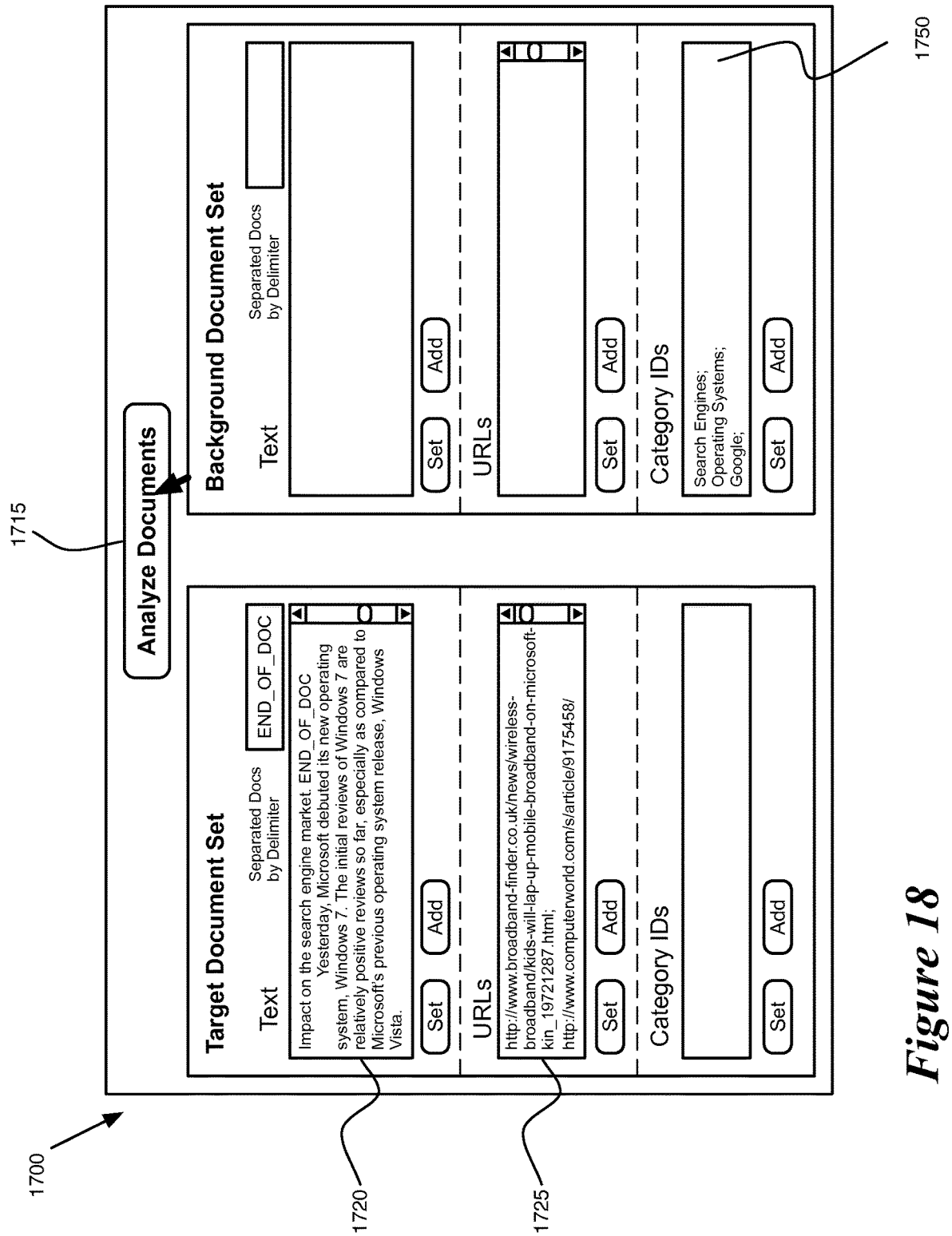

This situation is illustrated in FIG. 18. FIG. 18 illustrates the user interface 1700 after a user has entered text into fields 1720, 1725, and 1750. A user has entered at least two documents worth of text into the target document text entry field 1720. As shown, the user has entered a delimiter "END OF DOC" into delimiter field 1735, and this delimiter is used to separate the documents in the text entry field 1720. The user has also entered multiple URLs into the target document entry field 1725. The entries in the text entry field 1720 and the URL entry field 1725 are used to define the target document set.

In background document category ID entry field 1750, the user has entered three categories that are likely to have documents that are close to being about Microsoft, and will have many similar terms, but are not actually relevant to the company Microsoft specifically. These categories include "Search Engines", "Operating Systems", and "Google". In some embodiments, the application illustrated in FIGS. 15-25 runs on a computing device that is part of a system that uses the models to classify new documents from the world wide web (as described below in Section II). Documents stored in the system as related to the listed topics are used as the background set in this case.

FIG. 18 illustrates that the user has placed the cursor over the "Analyze Documents" selectable item 1715. This item is shown as a selectable button, but could be any sort of selectable item that a user can choose via mouse click or similar user interface interaction (e.g., touchscreen interaction). In some embodiments, selecting the button 1715 or its equivalent will cause the model development application to completely define a model. In other embodiments, as shown in the subsequent figure, the application calculates the word scores as described above in subsection A and presents the top words to the user.

Figure 19:
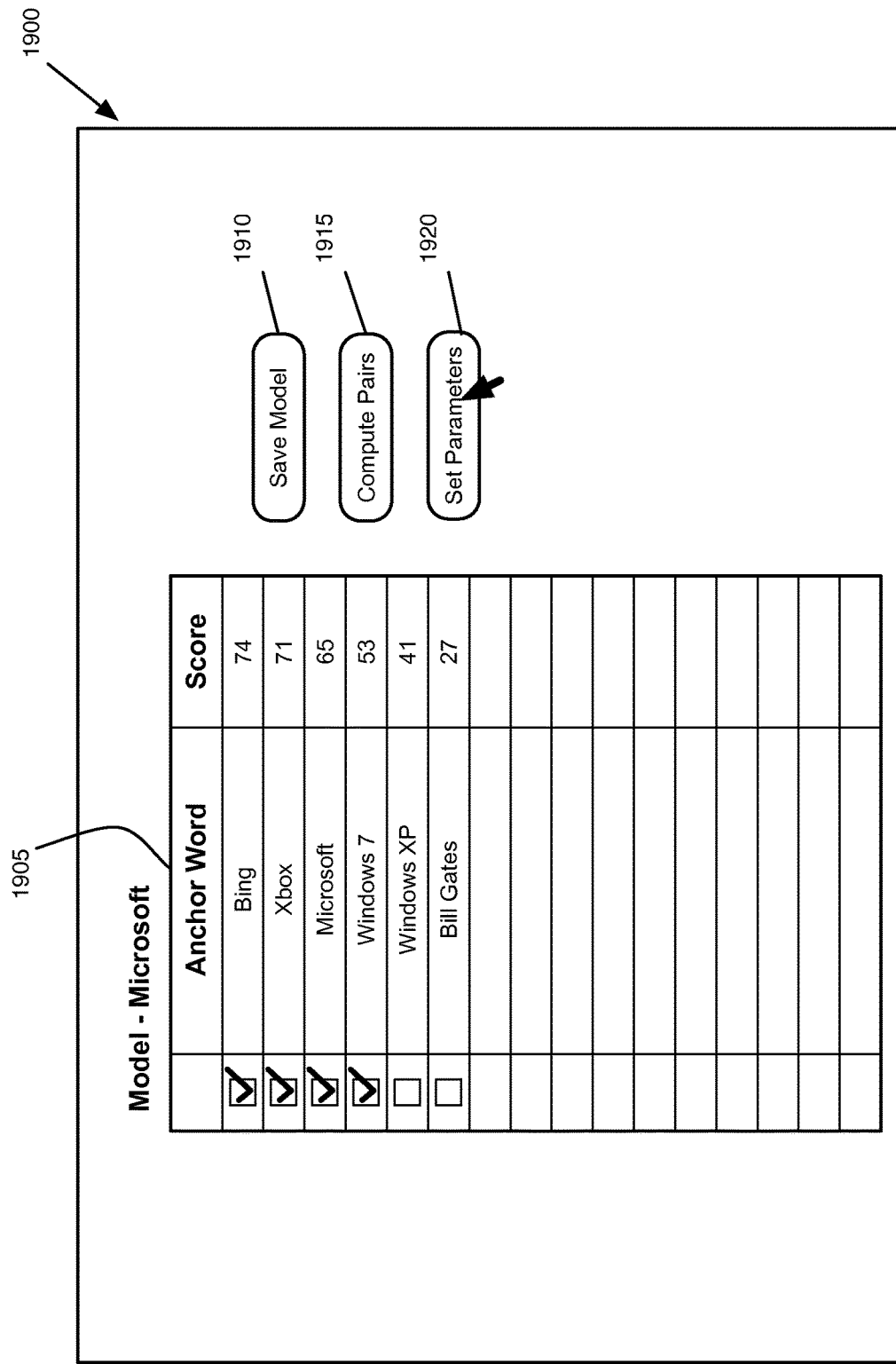
FIG. 19 illustrates a user interface that presents a list of potential anchor words to the user based on an analysis of the entered target and background documents.

FIG. 19 illustrates a user interface 1900 that presents a list of potential anchor words 1905 to the user based on an analysis of the entered target and background documents. The list of anchor words shown includes six words, all of which are related to Microsoft, and scores ranging from 27 to 74. Some embodiments present a particular number of potential anchor words (e.g., the 15 or 20 words with the highest scores), while other embodiments present all words with a score over a particular threshold. The list of anchor words 1905 also includes a set of checkboxes that enable the user to select or deselect different anchor words. In the example shown, the user has selected the four words with the highest scores.

The user interface 1900 also includes three selectable items: a "Save Model" item 1910, a "Compute Pairs" item 1915, and a "Set Parameters" item 1920. These items are shown as a selectable button, but could be any sort of selectable item that a user can choose via mouse click or similar user interface interaction (e.g., touchscreen interaction). In some embodiments, the "Save Model" button 1910 saves the list of selected anchor words and scores to a storage (e.g., as an XML file). The "Compute Pairs" button 1915 of some embodiments initiates a process such as process 600 described above, that uses the target and background documents along with the selected anchor words to identify word pairs and compute scores for the word pairs.

The "Set Parameters" button 1920 of some embodiments brings up a dialog box (or a similar user interface feature such as a new window) that enables the user to set various model parameters. These parameters may include a context definition, a threshold number of anchor words required to be present in a new document, what to do about new word pairs in a new document, etc. In FIG. 19, the user has placed the cursor over button 1920.

Figure 20:
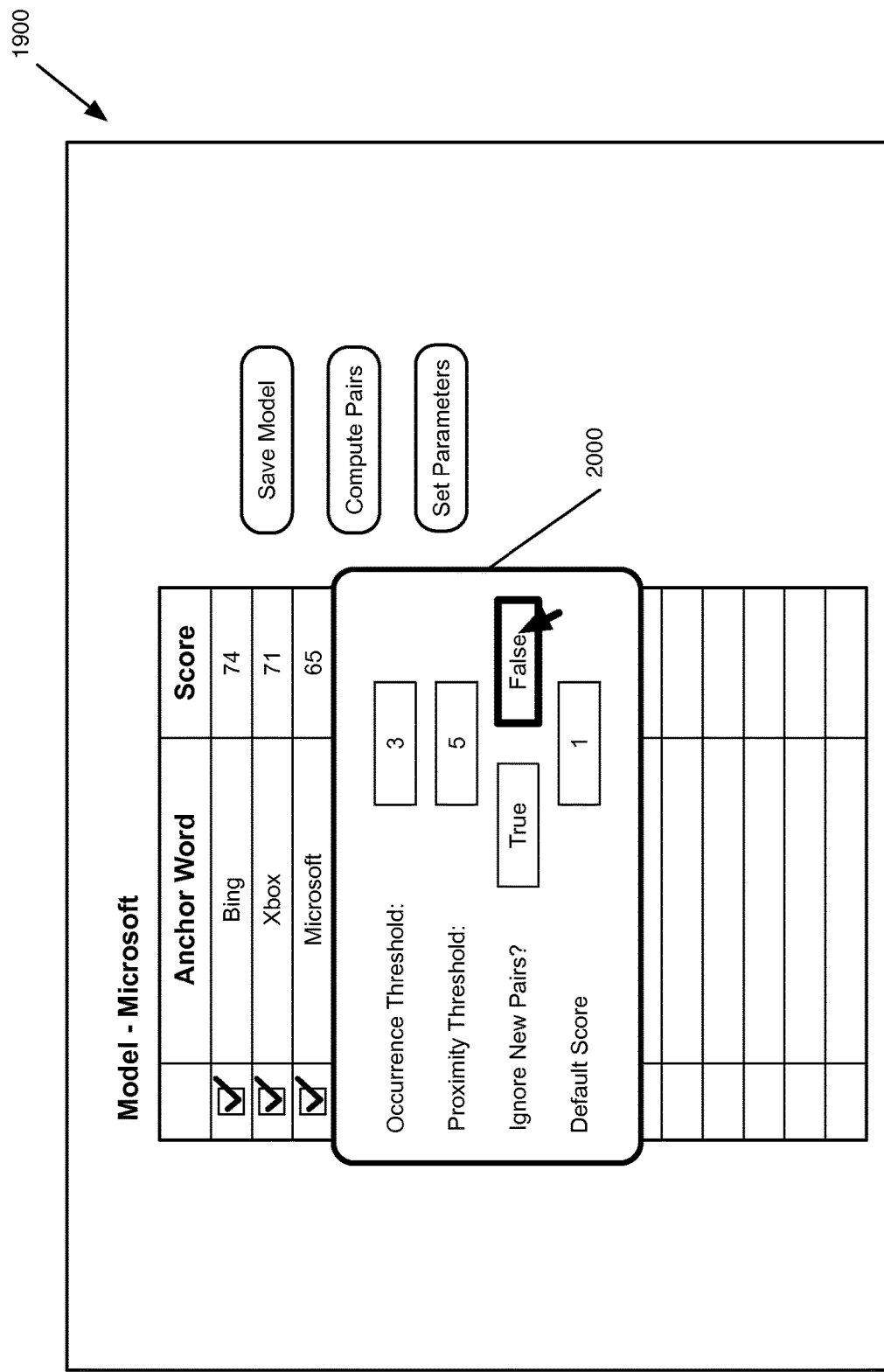
FIG. 20 illustrates the user interface of FIG. 19 along with a dialog box that appears as a result of the user's selection of "Set Parameters" button.

FIG. 20 illustrates user interface 1900 along with a dialog box 2000 that appears as a result of the user's selection of "Set Parameters" button 1920. The dialog box 2000 enables a user to set a number of parameters for the model being developed. The user can set the occurrence threshold, which is a minimum number of anchor word appearances in a new document for that document to be evaluated by the model. The user can also set the proximity threshold, which is a context definition that specifies how many words on either side of the anchor word will be considered context words for the anchor word. The user can also specify whether new word pairs in a new document being evaluated (i.e., an anchor word in the model with a context word not in the model) should be scored. When the user specifies that a score should be given to new pairs (as shown in FIG. 20), the user can also enter the default score that should be assigned to these new pairs.

In computing the word pairs, some embodiments use only the proximity threshold out of the model parameters shown in some embodiments. The other parameters are stored in the model definition and used to evaluate new documents.

Figure 21:
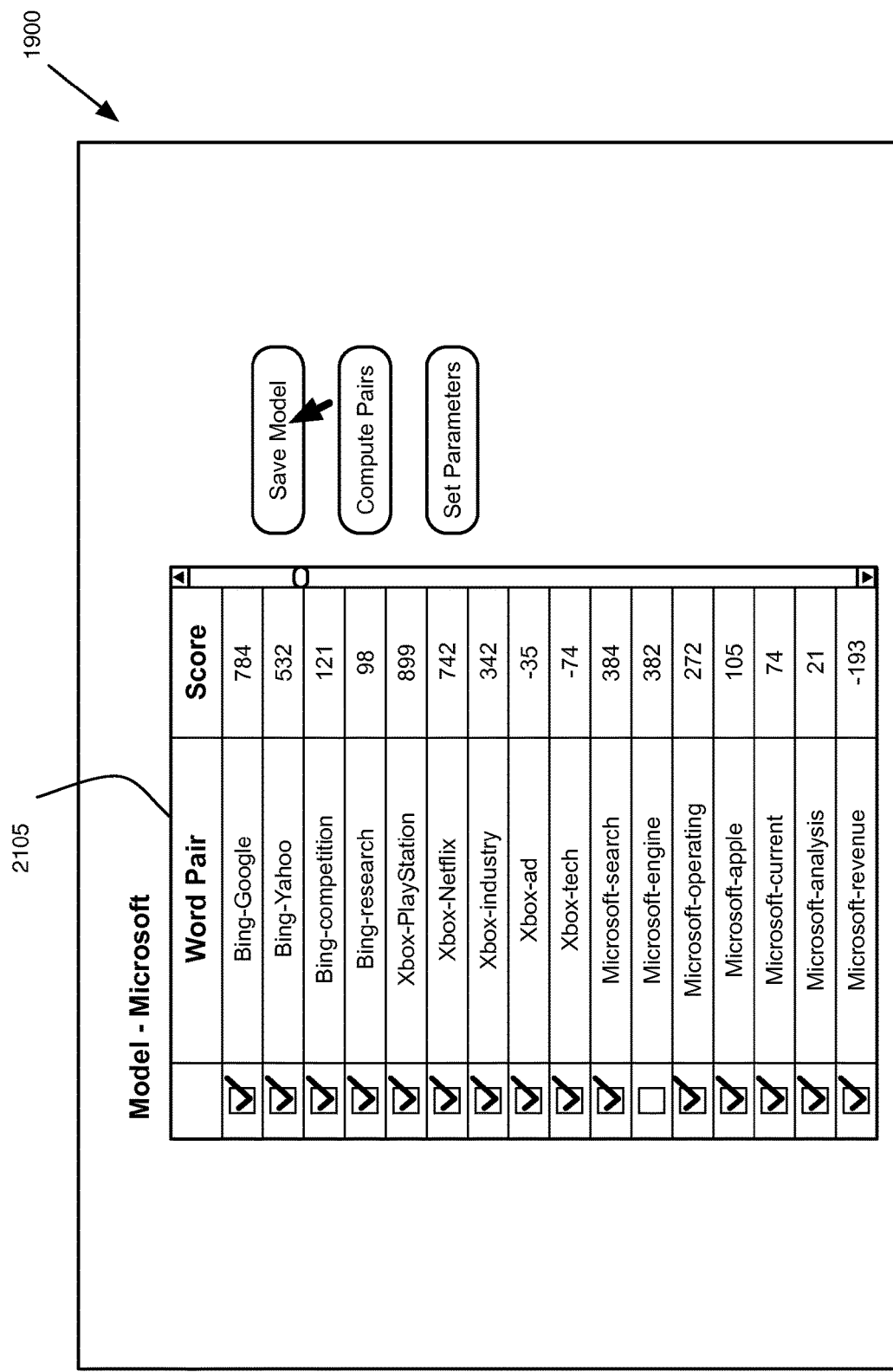
FIG. 21 illustrates the user interface of FIG. 19 after a user has selected the "Compute Pairs" button.

FIG. 21 illustrates the user interface 1900 after a user has selected the "Compute Pairs" button 1915. Rather than displaying the list of anchor words 1905, the user interface displays a list of word pairs 2105. In this example, the word pairs are listed by score for each anchor word. That is, the highest scoring anchor word's pairs are listed first, and these run from a score of 784 to a score of 98. The next highest scoring anchor word's pairs are then listed in score order, etc. Like the list of anchor words, the word pairs can be selected or deselected by the user. Once the user is satisfied, he can use button 1910 to save the model (e.g., as an XML file).

Figure 22:
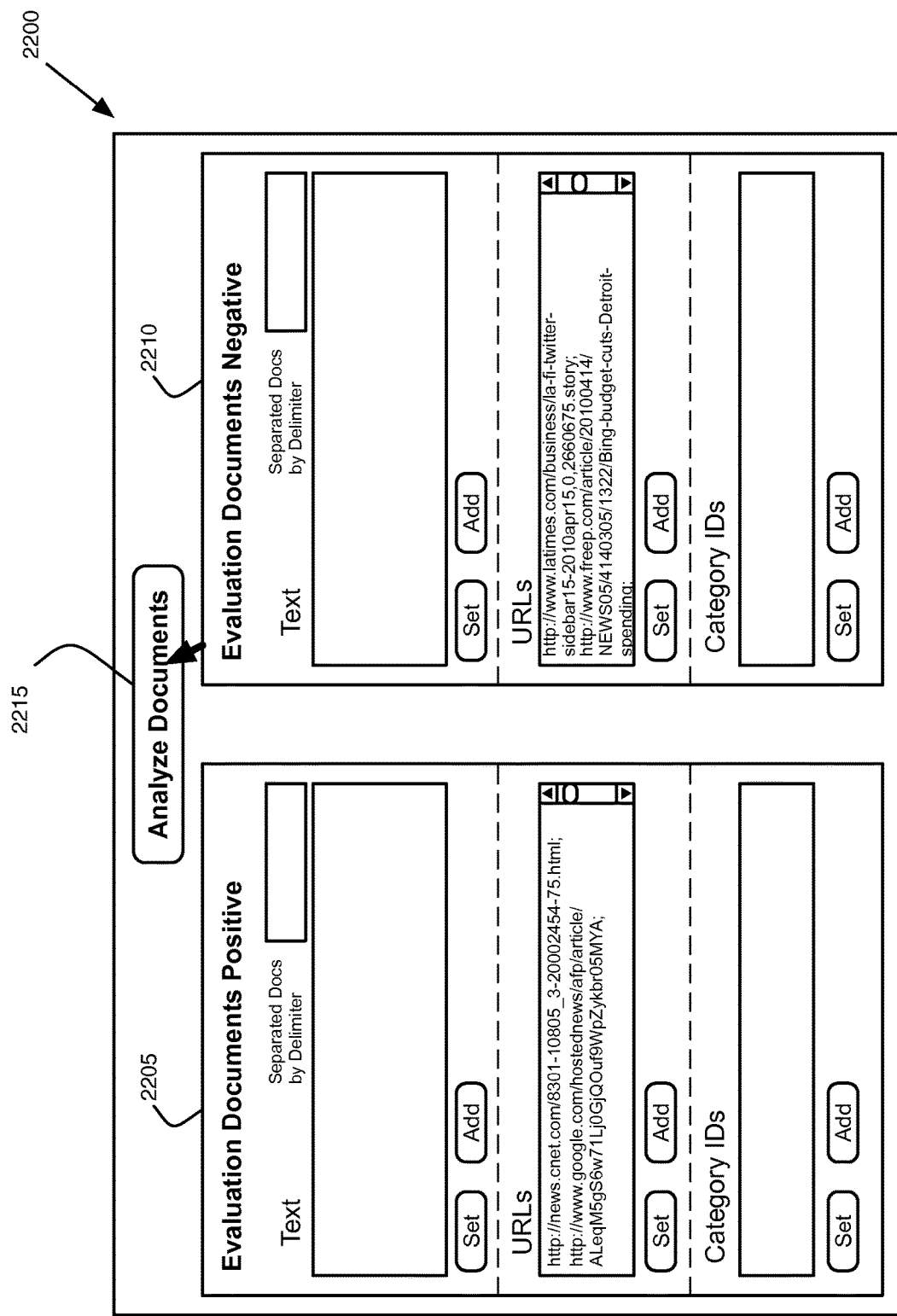
FIG. 22 illustrates a user interface that enables a user to input documents for evaluation.

As mentioned, some embodiments of the application will evaluate test documents to ensure that the model is accurately classifying documents. FIG. 22 illustrates a user interface 2200 that enables a user to input documents for evaluation. The user can enter positive evaluation documents (i.e., documents that the user believes are relevant to the category whose model is being tested) in entry form 2205 and can enter negative evaluation documents (i.e., documents that the user believes are not relevant to the category whose model is being tested) in entry form 2210. The types of ways to enter documents are the same as in the model development interface 1700 described above: text, URLs, and Category IDs.

In the example shown in FIG. 22, the user has entered two documents into each of the URL entry fields and is selecting the "Analyze Documents" button 2215. The selection of this button causes the application to evaluate the entered documents using a selected model (in this case, the Microsoft model described above by reference to FIG. 15-21). The details of the document evaluation process are described below in Section II.

Figure 23:
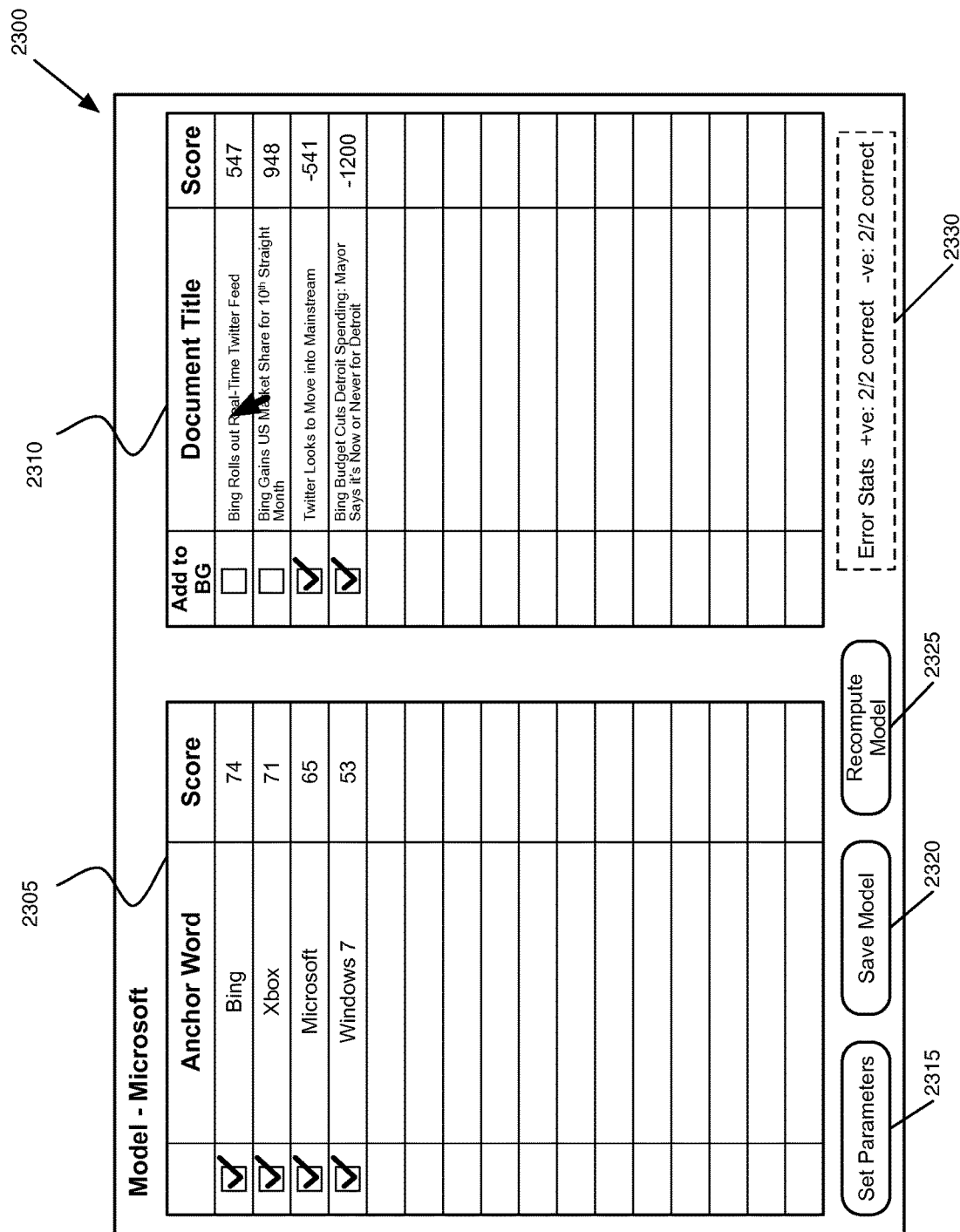
FIGS. 23-25 illustrate a user interface for displaying the evaluation results.

FIG. 23 illustrates a user interface 2300 for displaying the evaluation results. The user interface 2300 includes an anchor word list 2305, an evaluation results list 2310, three selectable user interface items 2315-2325, and evaluation statistics 2330. The anchor word list displays the anchor words used in the model being evaluated, and lets a user deselect any of the anchor words if the model is producing errors (i.e., classifying documents as related to the category when they actually are not, or vice versa). The user can deselect one or more anchor words and then use the "Recompute Model" button 2325 to recalculate word pairs and scores for the model, using its stored list of background and target documents for the model.

The evaluation results list 2310 lists the titles of the documents evaluated and the scores given to those documents by the model being evaluated. In the illustrated example, the two documents that were supposed to be relevant to the category Microsoft have very high scores, while the documents not relevant to Microsoft have very low scores. Thus, the evaluation statistics 2330 indicate that all of the evaluation documents were evaluated correctly by the model. The evaluation results list 2310 also includes an "Add to Background" column with checkboxes, that allows the user to add specific documents to the background document set for the model and recompute the model (i.e., by then selecting item 2325). A user may wish to add any negative evaluation documents to the background, but especially those for which the model gives a high relevancy score.

In some embodiments, a user may also select one of the documents (e.g., by double-clicking the title) in order to cause a new window or dialog box to pop up displaying the text of the document. In FIG. 23, the user has placed the cursor over the first document in the list, "Bing Rolls out Real-Time Twitter Feed".

Figure 24:
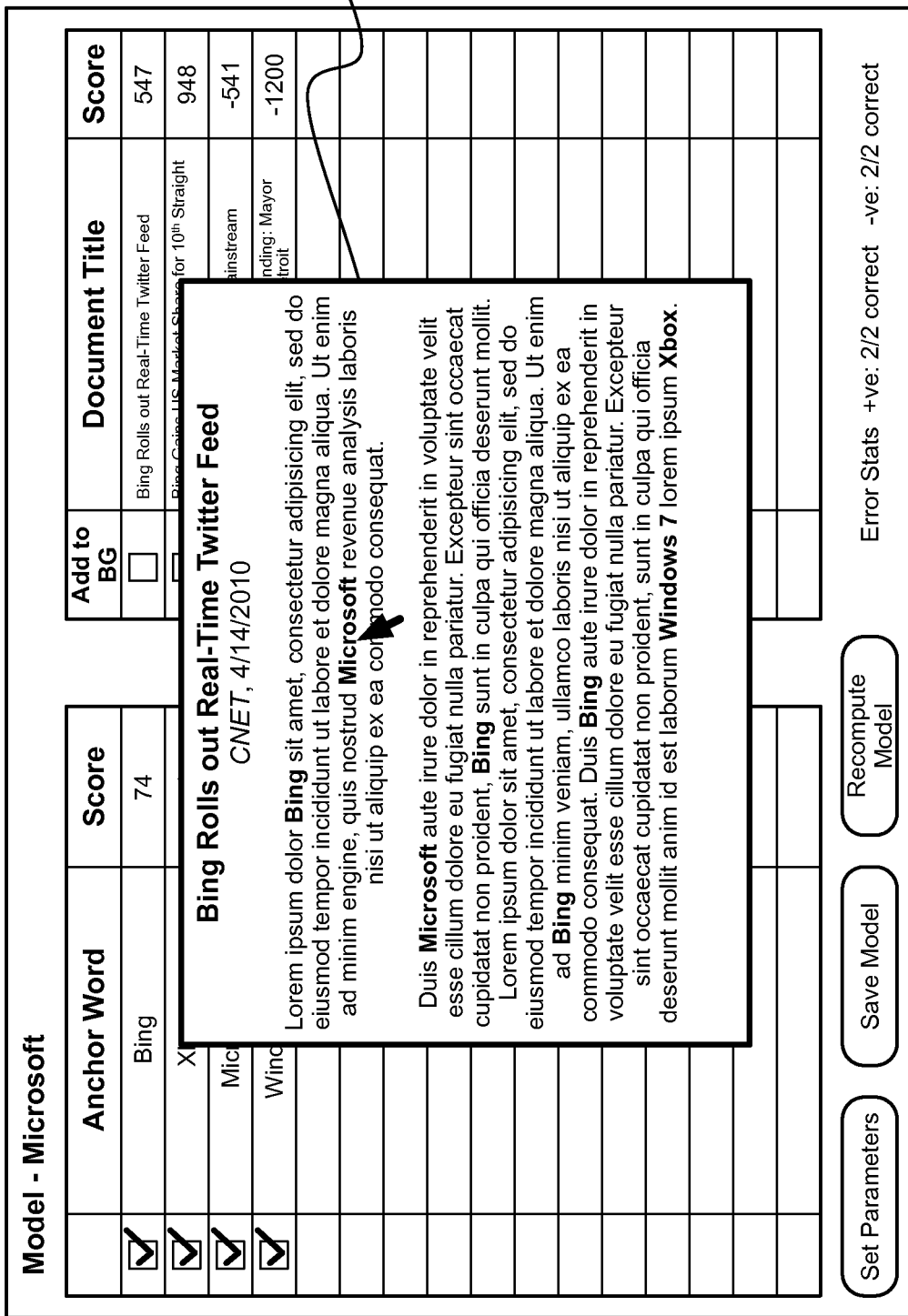

FIG. 24 illustrates the result of the user selecting the first document in the evaluation results list 2310. A new window 2400 is displayed over the user interface 2300. The window 2400 displays the title, source, and date of the document (if known), and then the full text of the document. Within the text, the anchor words are bolded (or highlighted, etc.) to indicate to the user which anchor words are present within the document. The user can also select one of the anchor words in order to view its context words.

Figure 25:
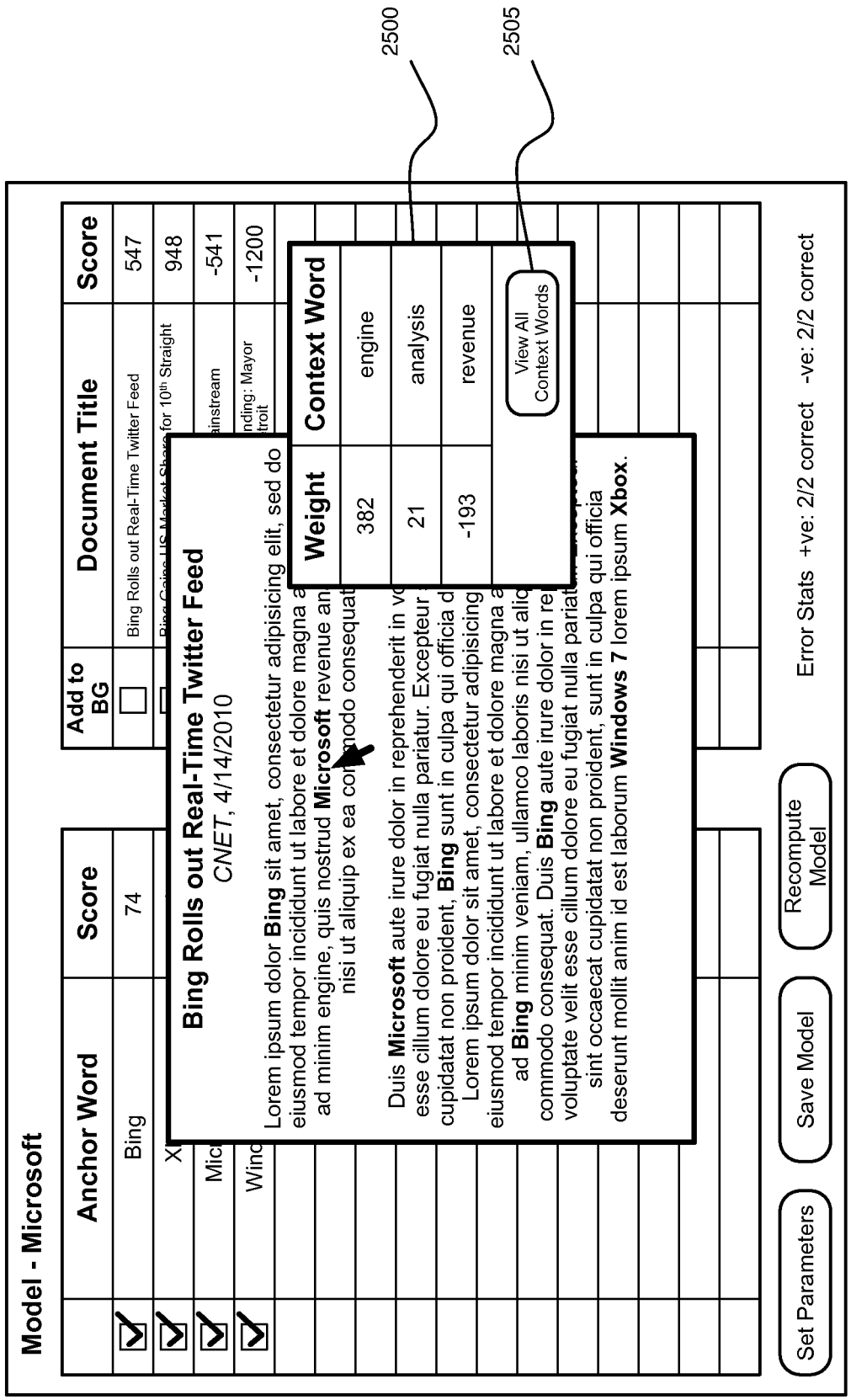

FIG. 25 illustrates that a user has selected the "Microsoft" anchor word located in line three of the displayed text. The three context words "engine", "analysis", and "revenue" are the only three context words from the model for Microsoft that are within the defined context of the selected anchor word. These anchor words and their score are located in a new window 2500 that is displayed. The window 2500 also displays a "View all Context Words" selectable item 2505. Selection of this item causes all context words in the model for the selected anchor word to be displayed in the list along with their scores.

One of ordinary skill will recognize that the application illustrated in FIGS. 15-25 is only one of many possible applications that could be used to enable a user to develop a model for a category. Other applications could present different user interfaces, enable different document sources, present different data, etc.

II. Classification of New Documents

The above section described in detail how a model is developed for a category. Once a model is developed, it can be used to evaluate new documents as either relevant or not to the category. Some embodiments develop the models within the framework of a system that crawls the Internet on a regular (e.g., daily) basis to identify new documents that have appeared and determines to which categories the new documents are relevant. The models developed as described in Section I are used to classify the documents for the various categories. In some embodiments, many thousands of different models are used for the various different categories—companies, people (e.g., executives), products, industries, etc.

A. Process for Evaluating a New Document

Figure 26:
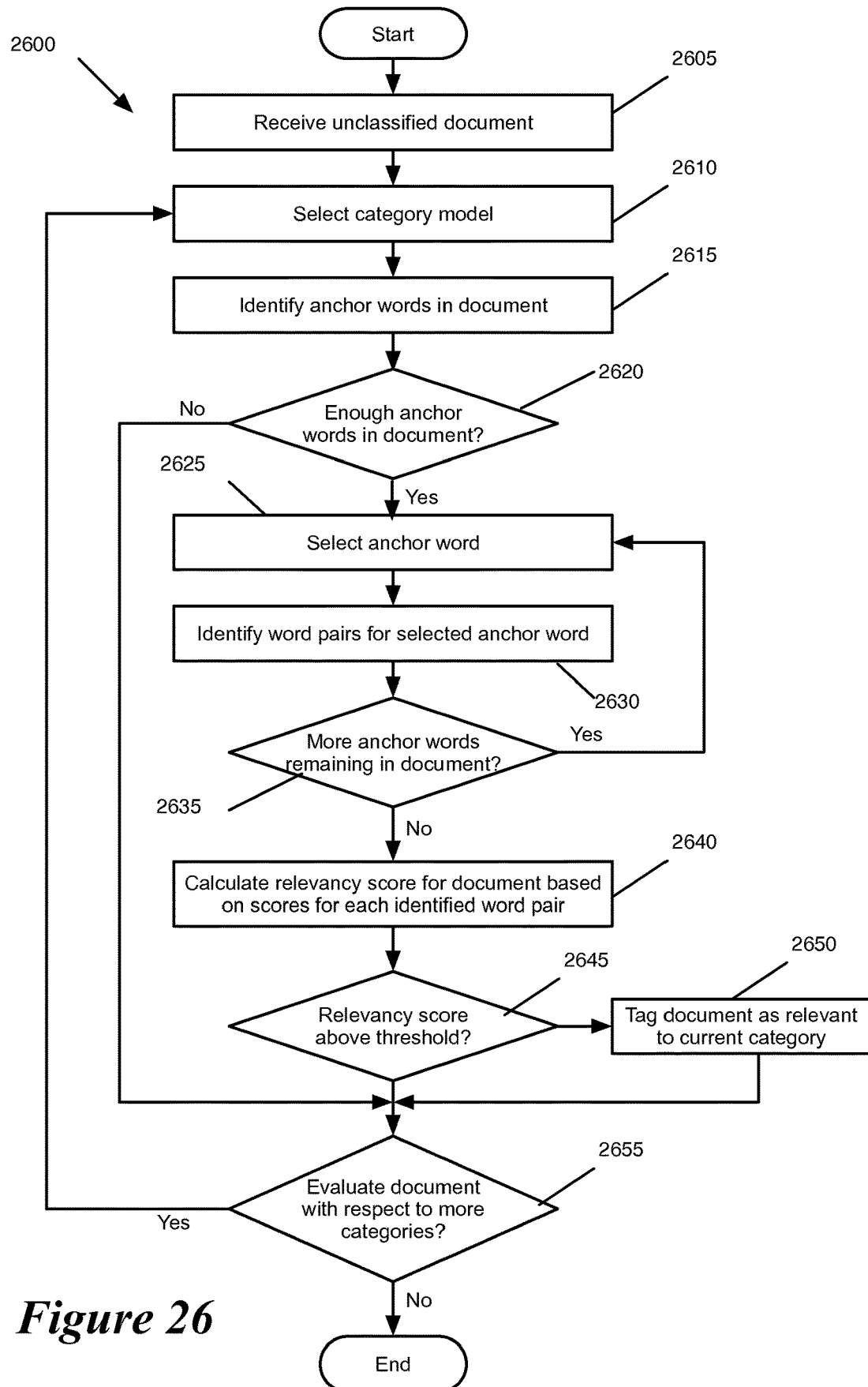
FIG. 26 conceptually illustrates a process of some embodiments for classifying a newly identified document.

FIG. 26 conceptually illustrates a process 2600 of some embodiments for classifying a newly identified document. In some embodiments, this process is performed for each of hundreds of thousands of documents that are identified and evaluated each day. In some embodiments, process 2600 is performed automatically on documents as they are identified and retrieved from the Internet.

As shown, process 2600 begins by receiving (at 2605) an unclassified (i.e., new) document. This may be a document published on the Internet detected by a crawler, or can be a document input by a user for model testing purposes, as shown above in FIG. 22. When the document is a published document detected by a crawler, some embodiments download the document to a local storage before performing the analysis, while other embodiments use the remotely stored copy. Some embodiments store a database with a list of documents. The database entry for a document includes a document identifier, a list of categories to which the document is relevant, and a score for each listed category.

The process then selects (at 2610) a category model. As mentioned, in some embodiments the document is evaluated by many models—tens of thousands, or more. The models are selected in a specific order in some embodiments (e.g., alphabetically, by creation date, etc.), while other embodiments randomly select the order in which the models evaluate a new document. In some embodiments, each model includes a list of word pairs and scores (from which the anchor words of the model can be identified) and a set of parameters (e.g., context definition, minimum anchor word occurrence threshold, default score for new pairs, etc.).

The process then identifies (at 2615) all anchor words in the document. Some embodiments parse the document to identify all of the words, and store the parsed results in a storage (e.g., volatile memory such as RAM or non-volatile memory such as a hard disk, solid-state memory, etc.). The parsed results are examined to identify all occurrences of each of the selected model's anchor words.

When the process has identified all of the anchor words, the process determines (at 2620) whether the document has enough anchor words to be evaluated using the currently selected model. Some embodiments use the occurrence threshold defined as a model parameter to determine whether there are enough anchor words in the current document. When there are not enough anchor words of the current model, the process does not evaluate the document with the current model and proceeds to 2655 to determine whether the document should be evaluated for relevancy to any further categories.

Otherwise, when enough anchor words are present in the document for evaluation, the process selects (at 2625) one of the anchor words identified in the document. Some embodiments select the anchor words in the order in which they are found in the document. Other embodiments select the anchor words in alphabetical order (with multiple instances of the same anchor word ordered based on appearance in the document), or select the anchor words in a random order.

The process 2600 then identifies (at 2630) the word pairs for the selected anchor word. That is, the process identifies all of the words in the context of the selected anchor word based on the context definition for the model. As described above, this may be a proximity threshold that specifies a distance, in number of words, from the anchor word. Other contexts can include words that are in the same sentence or paragraph, and may be specific to the anchor word or type of document.

In some cases, one or more of the identified context words is also an anchor word. Some embodiments ignore this and double-count the pair when the context word is the selected anchor word. Other embodiments store a note that the pair has been counted and do not count the pair twice. In some cases, though, the context is defined asymmetrically such that a first anchor word is in the context of a second anchor word but the second anchor word is not in the context of a first anchor word.

Some embodiments store (e.g., in volatile storage such as RAM or non-volatile storage such as a hard disk, solid state storage, etc.) the list of word pairs identified in the document. In some embodiments, this information is stored in volatile storage during the document evaluation process for the currently selected model, and then discarded after a document score has been calculated.

When all of the word pairs for the currently selected anchor word have been identified, the process 2600 determines (at 2635) whether any more anchor words that have not been evaluated remain in the document. When at least one more anchor word remains, the process returns to 2625 to select the next anchor word and identify all of its context words.

When all of the word pairs in the document have been identified for all of the anchor words, the process calculates (at 2640) a relevancy score for the document based on the scores in the model for each of the identified word pairs. Different embodiments score the documents differently. For example, some embodiments use an average (i.e., arithmetic mean) of the scores for all of the identified word pairs. Thus, to use a simple example, if there are four pairs identified, and they have scores of 150, 50, 25, and −25, the document will be given a score of 50. In some embodiments, if a word pair is identified multiple times in the document, that word pair's score will be used in the average multiple times.

Some embodiments, rather than using the average of all of the word scores, uses the median pair score, the maximum pair score, or the minimum pair score. Yet other embodiments use the sum of the scores for all of the identified pairs, which will tend to give higher scores to those documents with more anchor words. In some embodiments, before calculating any function (e.g., mean, median, etc.), outlier scores are thrown out. This may be a particular number of word pairs on the high and low end of scores (e.g., the five highest and lowest scoring pairs) or may be a particular percentage of the word pairs (e.g., the five percent of scores on either end).

As mentioned, some embodiments factor in scores for word pairs that are not found in the model definition (e.g., word pairs with an anchor word and a new context word). Such new word pairs are assigned a default score (e.g., the $25^{th}$ percentile score from the model) that is used in the calculation of the relevancy score for the document.

When the model development process throws out context words such as articles, conjunctions, prepositions, etc., the document scoring process will do so as well in some embodiments. This ensures that word pairs of an anchor word and a stop word (or other word that was thrown out during the development process) are not counted during the evaluation by being assigned the default score.

After the process 2600 has calculated a score for the document's relevancy to the current category, the process determines (at 2645) whether the calculated relevancy score is above a particular threshold (i.e., whether the document should be associated with the current category). Some embodiments set the threshold as zero, so that any document that is given a positive score is associated with the category. Other embodiments use a higher threshold in order to further filter out the documents.

When the document's score is above the threshold, the process tags (at 2650) the document as relevant to the current category. In some embodiments, each new document retrieved from the web is given an entry in a database. When a document has a high enough score for a particular category, fields identifying the category and giving the relevancy score for the category are appended to the database entry for the document. Other embodiments use other mechanisms to store document data. For instance, some embodiments store an XML file or similar data storage structure for each document, and use category and score tags to store the relevancy information in the data storage structure.

The process 2600 then determines (at 2655) whether the current document should be evaluated with respect to any more categories. As discussed, some embodiments perform this process in the context of a system that evaluates documents for relevancy to many thousands of different categories. Because of the anchor word threshold requirement, a document will not be fully evaluated by most of the models (e.g., a document about Microsoft will probably not have any anchor words for a State Farm Insurance model). When more categories remain, the process returns to 2610 to select another category. Once the document has been evaluated for every category in the system, the process ends (although the process will be performed again for the next document).

Figure 27:
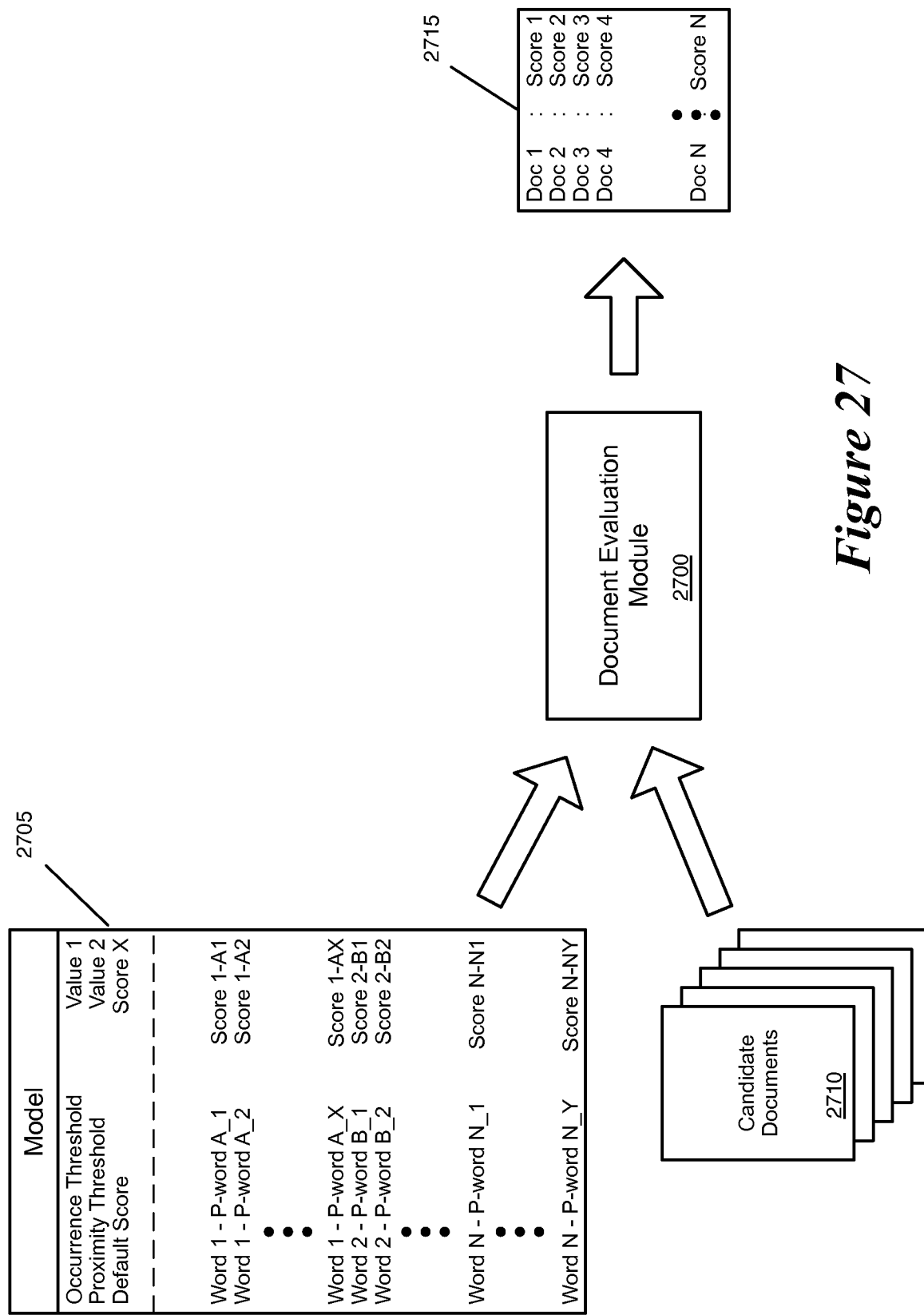
FIG. 27 illustrates the input and output of a document evaluation module of some embodiments.

FIG. 27 illustrates the input and output of a document evaluation module 2700. A model 2705 and a set of candidate documents 2710 are input to the document evaluation module 2700. In some embodiments, module 2700 performs some or all of process 2600 or a similar process. Using these inputs, the document evaluation module 2700 generates a list of scores 2715 for the particular category with which the model 2705 is associated. While FIG. 27 illustrates a single model as input, one of ordinary skill will recognize that some embodiments receive numerous models, as described above, and generate an array of document scores for the various categories.

Figure 28:
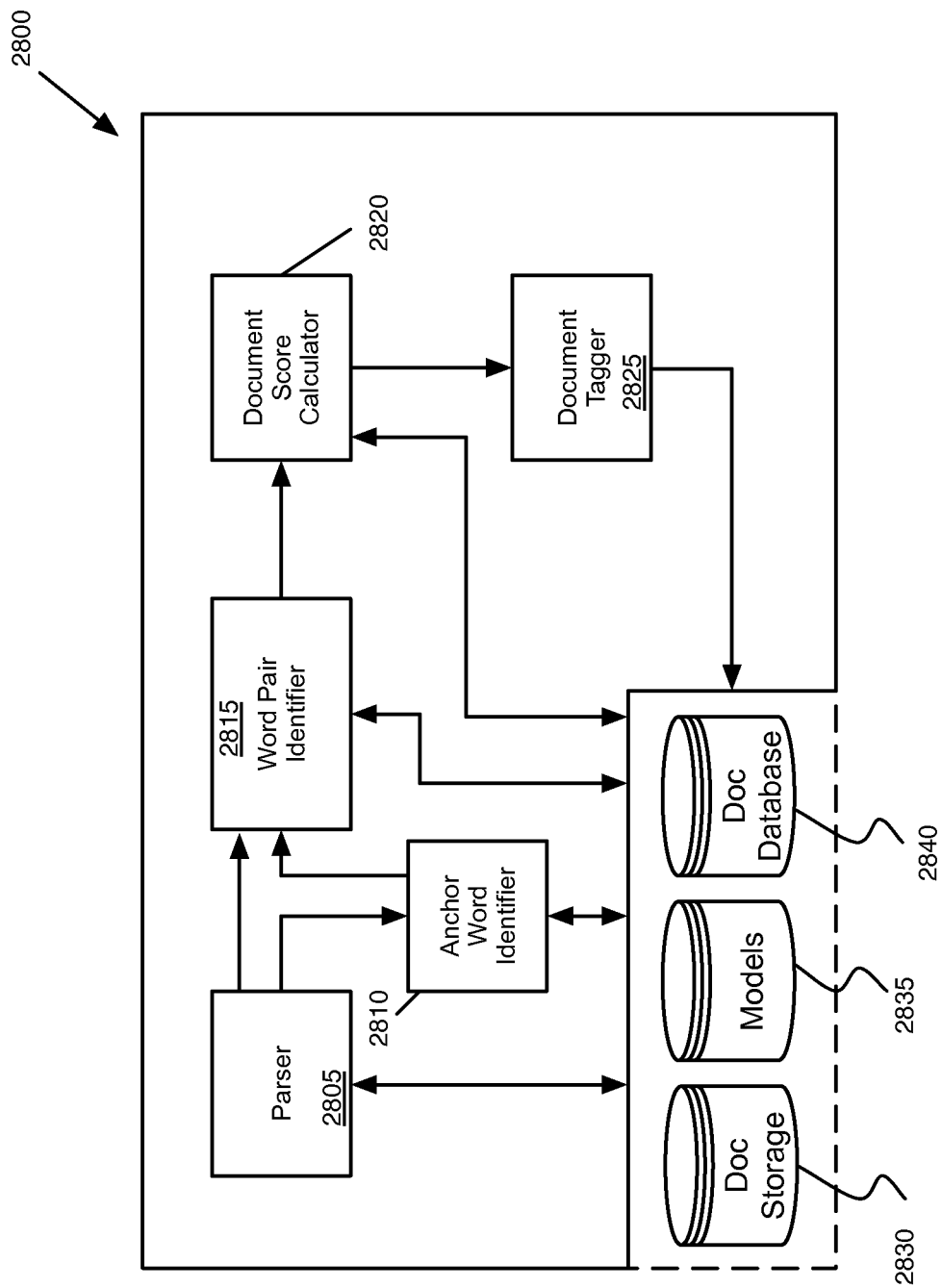
FIG. 28 conceptually illustrates the software architecture of a document evaluation module of some embodiments.

FIG. 28 conceptually illustrates the software architecture of a document evaluation module 2800 of some embodiments. The document evaluation module 2800 shown in this figure is one example of a module that receives one or more category models and one or more new documents and uses this input to output a list of scores for the documents that specifies the relevancy of the documents to the categories, as illustrated in FIG. 27.

The document evaluation module 2800 includes a parser 2805, an anchor word identifier 2810, a word pair identifier 2815, a document score calculator 2820, and a document tagger 2825. FIG. 28 also illustrates a document storage 2830, a model storage 2835, and a document database 2840. The document storage 2830 of some embodiments stores copies of the documents being evaluated, while the document database 2840 stores information about the relevancy of the documents to different topics. In some embodiments, storages 2830-2840 are one physical storage. In other embodiments, all three may be in different physical storages, or may be split between storages. For instance, some embodiments store the documents 2830 in one storage and the models 2835 and document database 2840 together in a different storage. Furthermore, some embodiments may split one of the illustrated storages across numerous physical storages (e.g., there may be so many documents that numerous storages are required to store copies of all of them).

The parser 2805 receives a document from the document storage 2830 and parses the document to identify all of the words in the document. In some embodiments, this information is then stored (e.g., in volatile memory such as RAM) for use by the other modules while the document is being evaluated. Some embodiments store a parsed copy of the document in the document storage 2830 that is easily accessible by the other modules.

The anchor word identifier receives the document information from the parser 2805 or storage 2830, and a model from storage 2835. The anchor word identifier identifies each instance of an anchor word of the received model. In some embodiments, the locations in the document of the various anchor words is stored in volatile memory for use while the document is evaluated by the word pair identifier. In some embodiments, the anchor word identifier performs a threshold measurement that prevents the document evaluation process from going any further if there are not enough anchor words in the document. This threshold evaluation is performed by a separate module in some embodiments.

The word pair identifier 2815 also receives the model information either from the anchor word identifier 2810 or from storage 2835. The word pair identifier also receives the document information from the parser 2805 or storage 2830, and the anchor word location information from the anchor word identifier 2810. The word pair identifier uses the anchor word locations and the context definition from the model to identify all context words for each anchor word in the document.

The document score calculator 2820 receives the model (from word pair identifier 2815 or storage 2835) and the identified word pairs from (from the word pair identifier) and calculates a score for the document. The score calculator 2820 looks up the score in the model for each received word pair, and calculates the score for the document. As discussed above, this may be an average of the scores, the median, the sum, etc.

The document tagger 2825 receives a relevancy score from the document score calculator and determines whether the document score is high enough for the document to be tagged as relevant to the category. When the document score is high enough, the document tagger enters the category and score information into the document entry in the database 2840.

The operation of the document evaluation module 2800 will now be described. The parser 2805 receives a document from the document storage 2830. This may be a document that was recently identified as new on the world wide web and downloaded into the document storage by a crawler. The parser parses the document to identify all of its words.

The anchor word identifier 2810 then receives this information, along with a model (e.g., an XML file or text file), and identifies all of the anchor words of the particular model that are present in the document. If there are not enough anchor words in the document, the anchor word identifier stops the evaluation process.

The word pair identifier then receives the model, the list of anchor words, and the parsed document information. The context information is used to determine all of the context word pairs for each of the anchor words and to associate the context words to the anchor words as word pairs.

These word pairs are sent to the document score calculator 2820, along with the model. The document score calculator uses the model to calculate a document score that quantifies the relevancy of the document to the category for which the model is defined. As noted above, the document score may be an average or other function of the various word pair scores.

The document score is sent to the document tagger 2825. The tagger determines whether the score is high enough that it should be recorded in the document database 2840. When the score is high enough, the document tagger 2825 creates a field for the category and the score and records this information.

As noted above, this is only one example of a document evaluation module. Different embodiments may have different sub-modules of the document evaluation module. For instance, some embodiments include a document retriever similar to that shown in FIG. 5 or FIG. 13, or include a separate anchor word occurrence threshold evaluator to identify whether there are enough anchor words present in the document. Furthermore, the flow of data may be different in some embodiments.

B. Multi-Model Document Evaluation

As described above, some embodiments evaluate hundreds of thousands of new documents using tens of thousands of models on a daily basis. This can be a very computationally intensive process. As such, some embodiments only use the models described above on documents that are reasonably likely to be relevant to a particular category.

In order to identify whether a particular document is likely to be relevant to a particular category, some embodiments first evaluate documents with a simpler, less computationally expensive model before using the context-based model described above. In some embodiments, the less computationally expensive model is a keyword-location based model that includes a set of keywords for a category and assigns scores to a document based on the presence and location in the document of the keywords.

Figure 29:
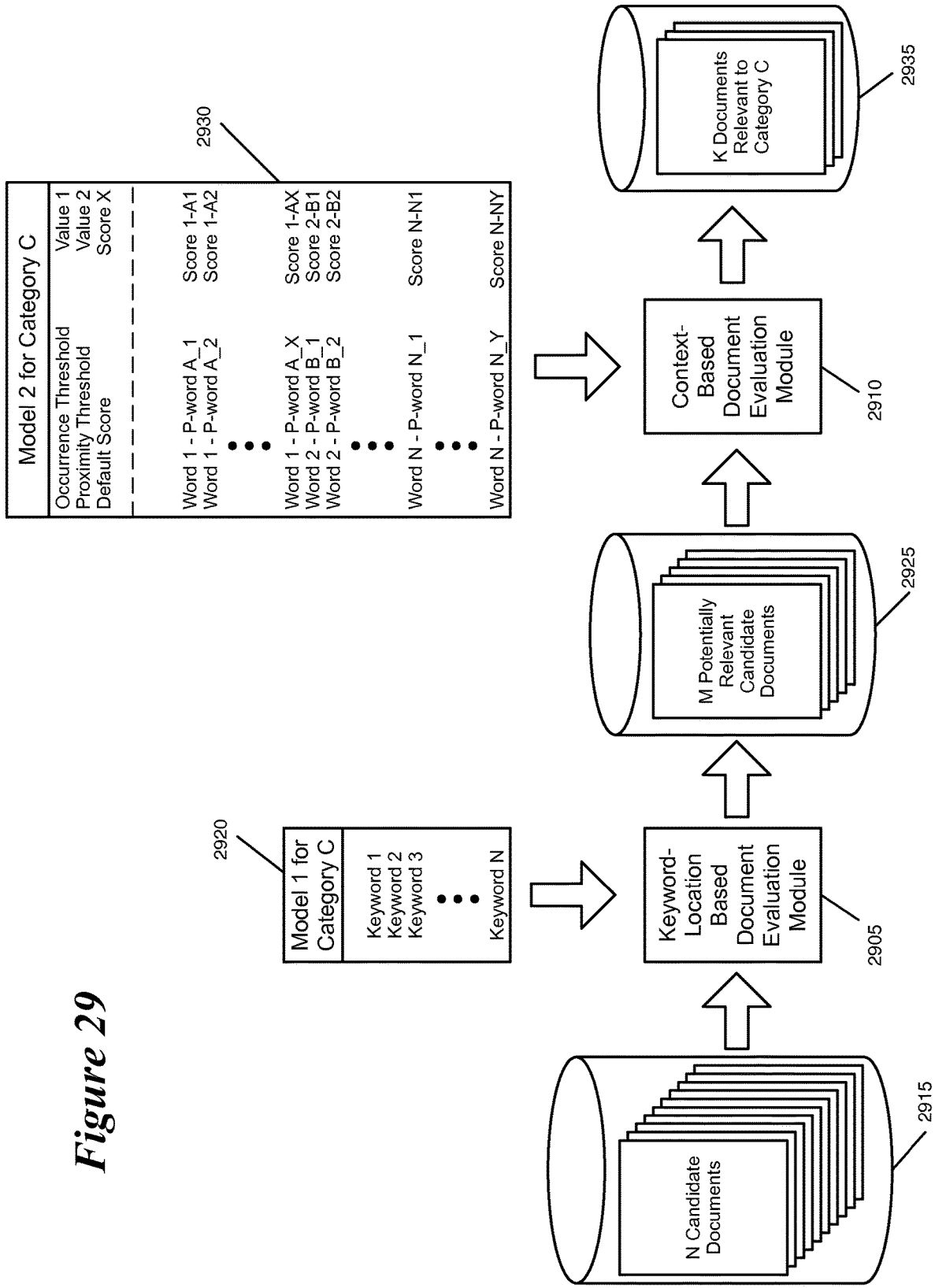
FIG. 29 illustrates the use of two document evaluation modules to identify documents relevant to a particular category according to some embodiments.

FIG. 29 illustrates the use of two document evaluation modules to identify documents relevant to a particular category according to some embodiments. As shown, documents are first evaluated using a keyword-location based document evaluation module 2905, and then documents determined potentially relevant by the keyword-location based document evaluation module 2905 are evaluated by a context-based document evaluation module 2910.

As illustrated in FIG. 29, a set 2915 of N candidate documents are initially stored. These documents are stored in a storage (e.g., document storage 2830 of FIG. 28). These documents are evaluated by the keyword-location based document evaluation module 2905. This module 2905 uses the model 2920 for Category C to assign a first relevancy score to each of the documents. As shown, the model 2920 includes a list of keywords that are indicative of relevancy to the category. For instance, a keyword model for the category Microsoft might include keywords such as "Microsoft", "Bing", "Xbox", "Windows XP", etc.

Some embodiments assign a score for a document based on the number of keywords present in the document. In addition, some embodiments determine the location of each keyword and give a higher score for keywords in certain locations. For example, a keyword in the title of the document might be worth three points, a keyword in the summary two points, and a keyword anywhere else in the document one point.

In addition to keywords and locations, some embodiments use other factors in the first model as well. For instance, some embodiment will use inclusion or exclusion sets to determine whether a keyword should count. For instance, a model might require that keyword A must be within five words of keyword B for the presence of keyword B to be considered a good match. If keyword B is found without keyword A, this will not be added into the document score. Different embodiments may also use other factors to denote whether to count a keyword or not.

When the documents are evaluated by the keyword-location based evaluation module 2905, only some of the documents will have a high enough relevancy score to be considered potentially relevant to Category C. As shown in FIG. 29, the output of the module 2905 is a set of M potentially relevant candidate documents, where M is less than or equal to N. These documents are shown as stored separately in storage 2925 in the figure. In some embodiments, the documents not relevant to Category C are not purged from the storage, nor are the potentially relevant documents stored in a new storage. Instead, a database with entries for each of the N documents is modified to include a category ID and score in each of the entries of the M potentially relevant documents. An example of such a database is described in further detail below by reference to FIGS. 30-32.

The M potentially relevant documents are then evaluated by the context-based document evaluation module 2910, which uses the model 2930 for Category C. The model 2930 is the type of model described in the preceding sections in some embodiments. Thus, the document evaluation module 2800 illustrated in FIG. 28 is one example of the context-based document evaluation module 2910. The module 2910 scores input documents based on the presence of anchor words and the context of those anchor words, as describe in subsection A above.

Of the M documents evaluated by the context-based document evaluation module 2910, only some of the documents will be considered relevant to Category C. As shown, the output of module 2910 is a set of K relevant documents, where K is less than or equal to M. These documents are shown as stored separately in storage 2935 in the figure. In some embodiments, the documents not relevant to Category C are not purged form the storage or stored in a new storage, but instead the scores in database entries are modified to reflect the new score from the second model.

In some embodiments, not all categories have two models. For instance, some embodiments only use the second, more computationally intensive context-based model when the initial model is producing a large number of false positives. For categories in which the keyword-location based model produces mostly accurate results, some embodiments do not use the context-based model. When the keyword-location based model produces a large number of false negatives (i.e., classifies documents as not relevant to a category when in fact the document is relevant), some embodiments run all documents through the context-based model for that category.

As noted above, some embodiments store category relevancy information in a database that includes entries for every document stored in a system. FIGS. 30-32 illustrate such a database and the modifications made to the database when the documents are put through the two-model process shown in FIG. 29.

FIG. 30 conceptually illustrates a database 3000 with entries for N different documents. Each document entry is denoted by a different ID in the document ID field. As shown, the database includes fields for numerous categories and relevancy scores.

FIG. 31 conceptually illustrates the database 3000 after the documents have been evaluated by keyword-location based models for various categories. The different documents are relevant to different categories, and only those categories for which a document is considered relevant have category tags and scores entered in the database. Some documents are relevant to numerous categories (e.g., Document 1 is relevant to Categories A, B, C, etc.), while other documents are only relevant to one or two categories (e.g., Document N is relevant to Category G only).

FIG. 32 conceptually illustrates the database 3000 after the documents are evaluated by the context-based models for at least some of the categories for which they have entries in the database. This causes some of the scores to change. For instance, Document 1 was initially scored as moderately relevant to Category A, with a score of 14, as shown in FIG. 31. After evaluation by the context-based model for Category A, however, Document 1 now has a score of −47, indicating that it is not relevant for that category. On the other hand, neither of the scores for Category B have changed, possibly because the keyword-location based model for Category B has been found reliable enough to not use the context-based model.

C. Modifying a Model Based on New Documents

In some embodiments, the models are changed based on results of documents that are classified as relevant to the model. For example, when a new product is made public or released by a company, the name of that product may be a useful anchor word for the model for that company. Furthermore, the new product may be a useful new category itself. Some embodiments use an automated process to examine new documents for new anchor words and/or categories.

Figure 33:
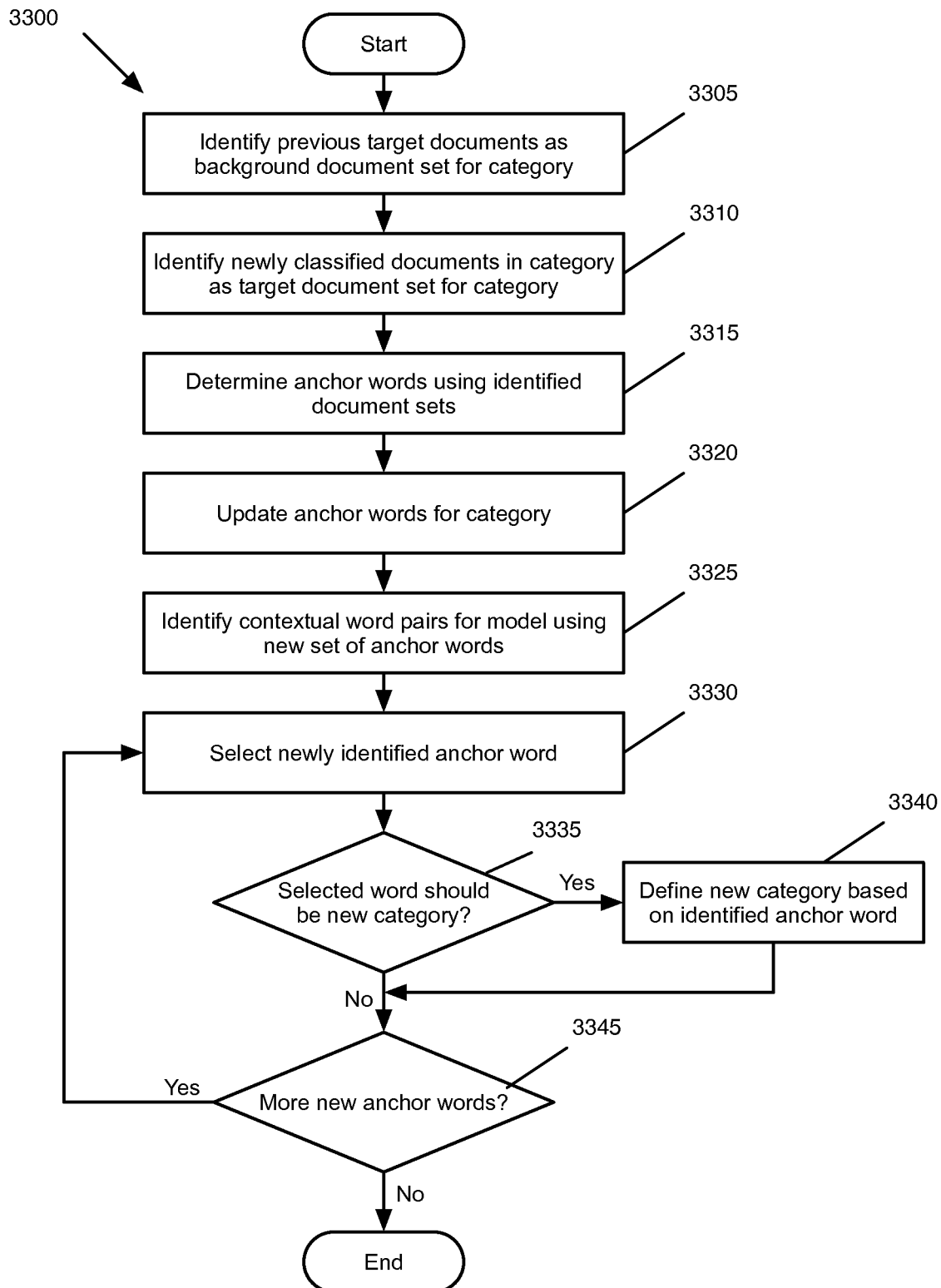
FIG. 33 illustrates a process 3300 for updating a model.

FIG. 33 illustrates a process 3300 for updating a model. In some embodiments, process 3300 is an automated process that is run at regular intervals (e.g., once a week, once a month, etc.). Process 3300 begins by identifying (at 3305) the previous target documents for a category (or older documents categorized as relevant to that category) as the background document set for the category. The process also identifies (at 3310) newly classified documents in the category as the target document set. This will ensure that the words determined as anchor words are those that are new to the category.

The process then determines (at 3315) anchor words using the identified document sets. Some embodiments use process 300 to determine the anchor words. As mentioned, the words with the highest scores will be those that appear prominently in the new documents about a category but do not appear as much in the older documents.

The process then updates (at 3320) the list of anchor words for the category. Some embodiments automatically include all of the newly discovered words. On the other hand, some embodiments require user validation for any of the new anchor words. In this case, the words are presented to the user who can either reject or accept the new anchor words. The set of anchor words will then include any newly accepted anchor words in addition to all of the previous anchor words that were already part of the model.

The process then identifies (at 3325) contextual word pairs for the model using the new anchor words. To identify and score the word pairs, some embodiments use process 600. Some embodiments use the original background set that was used to develop the initial model as the background set for this process. For the target document set, some embodiments use the original target documents as well as all of the new documents classified as relevant to the category. At this point, the model is updated with a new set of word pairs and scores for the word pairs. The process also examines the new anchor words to determine whether any new categories should be developed.

For this stage, the process 3300 selects (at 3330) one of the newly identified anchor words. The process determines (at 3335) whether the selected word should be a new category. When the word should be a new category, the process defines (at 3340) a new category based on the identified word. If the new anchor word is a new executive, product, subsidiary, etc., it may be a useful category for which a model should be developed. Some embodiments display the list of new words to the user with an option to define a category. When the user selects that a category should be defined for one of the words, a user interface such as that shown in FIG. 17 is displayed so that a user can input background and target document sets for the new category.

The process then determines (at 3345) whether there are any more new anchor words that could be used as new categories. When there are more words remaining, the process returns to 3330 to select another of the words. When all of the words have been checked, the process ends.

III. Software Architecture

Figure 34:
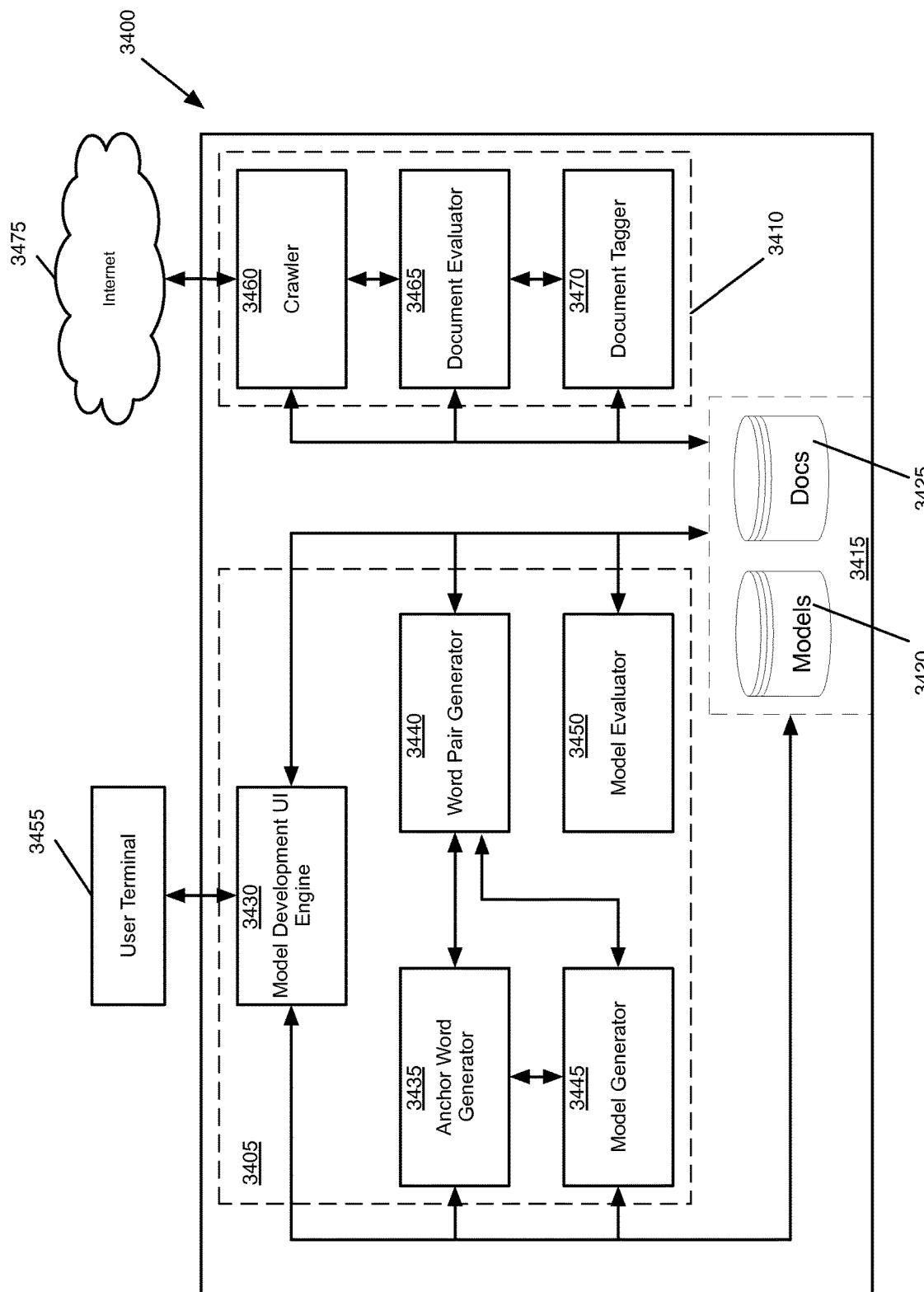
FIG. 34 conceptually illustrates the overall software architecture of a system of some embodiments.

As described above, in some embodiments the models discussed in this application are developed and used within a system that categorizes new documents from the web on a regular basis for many thousands of different categories. FIG. 34 conceptually illustrates the overall software architecture of such a system 3400 of some embodiments. One of ordinary skill will recognize that the various modules shown in this figure may all operate on a single electronic device (e.g., a server) or may be spread among multiple devices.

The system 3400 includes a model development application 3405, a document retrieval and classification system 3410, and storages 3415. The storages 3415 include a model storage 3420 and a document storage 3425. In some embodiments, the document storage 3425 includes both copies of documents uploaded to the system or retrieved from the Internet as well as a document database storing relevancy information for the documents. These storages may be entirely contained on one physical storage or may be spread across multiple physical storages (e.g., one storage for the models and another for the documents, multiple storages for the documents, etc.).

The model development application 3405, in some embodiments, is the application described by reference to FIGS. 15-25. This is an application through which a user develops models for various categories. The model development application 3405 includes a model development UI engine 3430, an anchor word generator 3435, a word pair generator 3440, a model generator 3445, and a model evaluator 3450.

The model development UI engine 3430 receives data from the model storage 3420 and the various other modules of the model development application and presents this information through a user interface (e.g., the user interfaces illustrated in FIGS. 15-25) to a user at a user terminal 3455. The user terminal 3455 may be a local terminal or may be a terminal that accesses application 3405 through a network (e.g., a local network, a wide area network, a network of networks, etc.). The UI engine 3430 receives user input (e.g., target and background document set lists, selections of UI items, etc.) and distributes this information to the various other modules of application 3405.

The anchor word generator 3435 generates anchor words for a given background and target document set. The anchor word generation module 500 illustrated in FIG. 5 is one example of such a module. The word pair generator 3440 generates word pairs and scores for a given background and target document sets, list of anchor words, and context definition. The word pair generation module illustrated in FIG. 13 is one example of such a module.

The model generator 3445 takes a set of model parameters and a list of word pairs and scores and defines a model for a particular category. The model may be stored as a text file, XML file, etc., and is stored in the model storage 3420. The model evaluator 3450 receives positive and/or negative evaluation documents and scores the documents using a given model. The evaluator 3450 presents the results to a user via the model development UI engine 3430 so that the user can determine whether to tweak the model or not.

The models developed using the module development application 3405 are stored in storage 3420. These models can then be accessed by the document retrieval and classification system 3410 for use in evaluating newly retrieved documents. The document retrieval and classification system 3410 includes a crawler 3460, a document evaluator 3465, and a document tagger 3470. The crawler 3460 is connected to the Internet 3475 and crawls the Internet on a regular basis in order to identify new documents. Some embodiments download copies of these new documents and store the copies in the document storage 3425.

The document evaluator 3465 evaluates each of the new documents using models for a wide variety of categories to determine which documents are relevant to which categories. The document evaluation module 2800 of FIG. 28 is one example of such a module. The document tagger tags the documents in the document storage 3425 with the category tags and scores for the categories to which the documents are relevant. In some embodiments, the tagging entails entering information into a database entry for the document.

In some embodiments, the document relevancy information is accessed by third party users of the system via remote terminals. The users may search for information related to a particular category, and are presented with information such as (i) lists of recently published documents that relate to the particular category, (ii) links to the relevant documents, (iii) categories related to the particular category, (iv) recent events related to the particular category as determined by analysis of the relevant documents, etc. When the category is a company, a graph of the company's stock price or recent management changes may be presented as well. Various other modules that are not shown in FIG. 34 may be used to enable user connections, present information to the user, analyze the documents related to a particular category to identify facts or events about the category subject, etc.

While many of the features of system 3400 have been described as being performed by one module (e.g., the document evaluator 3465), one of ordinary skill will recognize that the functions might be split up into multiple modules (e.g., a keyword-location based evaluation module and a context-based evaluation module). Furthermore, the modules shown might be combined into a single module in some embodiments (e.g., the document tagger 3470 could be part of the document evaluator 3465).

IV. Computing Device

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 35:
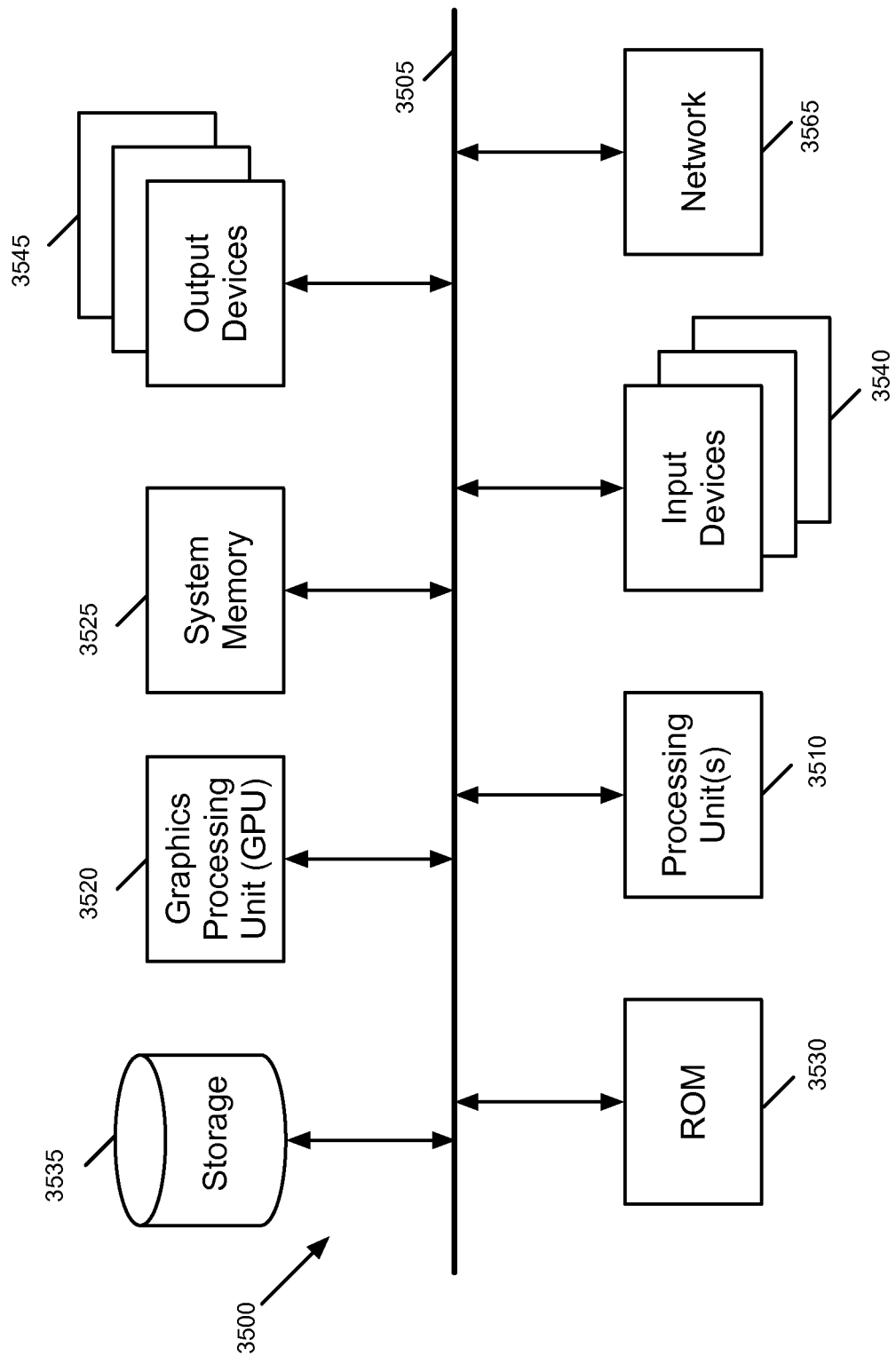
FIG. 35 conceptually illustrates a computing device with which some embodiments of the invention are implemented.

FIG. 35 illustrates a computer system with which some embodiments of the invention are implemented. Such a computer system includes various types of computer readable media and interfaces for various other types of computer readable media. One of ordinary skill in the art will also note that the digital video camera of some embodiments also includes various types of computer readable media. Computer system 3500 includes a bus 3505, a processor 3510, a graphics processing unit (GPU) 3520, a system memory 3525, a read-only memory 3530, a permanent storage device 3535, input devices 3540, and output devices 3545.

The bus 3505 collectively represents all system, peripheral, and chipset buses that communicatively connect the numerous internal devices of the computer system 3500. For instance, the bus 3505 communicatively connects the processor 3510 with the read-only memory 3530, the GPU 3520, the system memory 3525, and the permanent storage device 3535.

From these various memory units, the processor 3510 retrieves instructions to execute and data to process in order to execute the processes of the invention. In some embodiments, the processor comprises a Field Programmable Gate Array (FPGA), an ASIC, or various other electronic components for executing instructions. Some instructions are passed to and executed by the GPU 3520. The GPU 3520 can offload various computations or complement the image processing provided by the processor 3510.

The read-only-memory (ROM) 3530 stores static data and instructions that are needed by the processor 3510 and other modules of the computer system. The permanent storage device 3535, on the other hand, is a read-and-write memory device. This device is a non-volatile memory unit that stores instructions and data even when the computer system 3500 is off. Some embodiments of the invention use a mass-storage device (such as a magnetic or optical disk and its corresponding disk drive) as the permanent storage device 3535.

Other embodiments use a removable storage device (such as a floppy disk, flash drive, or ZIP® disk, and its corresponding disk drive) as the permanent storage device. Like the permanent storage device 3535, the system memory 3525 is a read-and-write memory device. However, unlike storage device 3535, the system memory is a volatile read-and-write memory, such a random access memory. The system memory stores some of the instructions and data that the processor needs at runtime. In some embodiments, the invention's processes are stored in the system memory 3525, the permanent storage device 3535, and/or the read-only memory 3530. For example, the various memory units include instructions for processing multimedia items in accordance with some embodiments. From these various memory units, the processor 3510 retrieves instructions to execute and data to process in order to execute the processes of some embodiments.

The bus 3505 also connects to the input and output devices 3540 and 3545. The input devices enable the user to communicate information and select commands to the computer system. The input devices 3540 include alphanumeric keyboards and pointing devices (also called "cursor control devices"). The output devices 3545 display images generated by the computer system. The output devices include printers and display devices, such as cathode ray tubes (CRT) or liquid crystal displays (LCD).

Finally, as shown in FIG. 35, bus 3505 also couples computer 3500 to a network 3565 through a network adapter (not shown). In this manner, the computer can be a part of a network of computers (such as a local area network ("LAN"), a wide area network ("WAN"), or an Intranet, or a network of networks, such as the internet. Any or all components of computer system 3500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It should be recognized by one of ordinary skill in the art that any or all of the components of computing device 3500 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. Moreover, while the examples shown illustrate many individual modules as separate blocks (e.g., document retriever 1305 and parser 1310 of FIG. 13, etc.), one of ordinary skill in the art would recognize that some embodiments may combine these modules into a single functional block or element. One of ordinary skill in the art would also recognize that some embodiments may divide a particular module into multiple modules.

In addition, a number of the figures (including FIGS. 2, 3, 6, 26, and 33) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

What is claimed is:

1. A method for defining and utilizing a content relevance model for a particular category to at least in part determine whether a content segment is relevant to the particular category, the method comprising:

executing code by a processor for a first computer system to cause the processor of the first computer system to perform operations comprising:

sending a first set of content segments that contain content relevant to the particular category and a second set of content segments that contain content not relevant to the particular category; and receiving, from a second computer system, documents that are relevant to one or more particular categories, wherein the documents are identified by a second computer system executing code by a processor to perform operations comprising:

receiving the first set of content segments;

identifying a set of key word sets more likely to appear in the first set of content segments than the second set of content segments; and defining a content relevance model that comprises a set of groups of word sets and a score for each group, each of the groups of word sets comprising a key word set from the set of key word sets and at least one word set found in a context of the key word set in at least one of the received content segments, wherein defining the content relevance model further comprises:

determining the set of key word sets for the particular category based on an analysis of (i) a first set of content segments defined as relevant to the particular category and (ii) a second set of content segments defined as not relevant to the particular category;

determining (i) a set of pairs of word sets that each comprise a key word set and a word set that appears in a defined context of the keyword and (ii) a score for each of the word set pairs, the score for a particular word set pair quantifying a likelihood that a content segment containing the word set pair is relevant to the particular category; and defining a content relevance model for the particular category, the content relevance model comprising (i) a context definition and (ii) the set of word set pairs and corresponding scores;

utilizing the content relevance model in a system to identify content segments in documents for relevancy to the one or more particular categories;

providing the documents that are relevant to the one or more particular categories to the first computer system.

2. The method of claim 1, wherein the content segments comprise text documents.

3. The method of claim 1, wherein the particular category comprises one of a company, product, person, industry, or concept.

4. The method of claim 1, wherein identifying the set of key word sets comprises:

calculating a score for each word set that appears in at least one content segment of the first or second sets of content segments;

identifying a plurality of word sets with the highest scores as the key word sets.

5. The method of claim 4, wherein calculating a score for a particular word set comprises comparing a probability of finding the particular word set in the first set of content segments and a probability of finding the particular word set in the second set of content segments.

6. The method of claim 5, wherein calculating the score for the particular word set further comprises accounting for a number of occurrences of the particular word set in the first set of content segments.

7. The method of claim 1, wherein defining the content relevance model comprises:

identifying the set of groups of word sets;

calculating a score for each group of word sets; and storing (i) the set of groups of word sets (ii), the calculated scores, and (iii) a set of model parameters in the content relevance model.

8. The method of claim 7, wherein the content relevance model is stored as a text file.

9. The method of claim 1, wherein the groups of word sets are pairs of word sets.

10. A method for defining and utilizing a content relevance model for a particular category, the method comprising:

executing code by a processor for a first computer system to cause the processor of the first computer system to perform operations comprising:

determining a set of key word sets for the particular category based on an analysis of (i) a first set of content segments defined as relevant to the particular category and (ii) a second set of content segments defined as not relevant to the particular category;

determining (i) a set of pairs of word sets that each comprise a key word set and a word set that appears in a defined context of the keyword and (ii) a score for each of the word set pairs, the score for a particular word set pair quantifying a likelihood that a content segment containing the word set pair is relevant to the particular category;

defining a content relevance model for the particular category, the content relevance model comprising (i) a context definition and (ii) the set of word set pairs and corresponding scores; and utilizing the content relevance model in a system to identify content segments in documents for relevancy to one or more particular categories.

11. The method of claim 10, wherein the defined context of a key word set is a context defined for the content relevance model.

12. The method of claim 10, wherein a word set appears in the defined context of a key word set when the word set is within a particular number of words surrounding the key word set in a content segment.

13. The method of claim 10, wherein a word set appears in the defined context of a key word set when the word set is in the same sentence in a content segment as the key word set.

14. The method of claim 10, wherein a word set appears in the defined context of a key word set when the word set is in the same paragraph in a content segment as the key word set.

15. The method of claim 10, wherein determining a score for a particular word set pair comprises comparing a function calculated for the particular word set pair in the first set of content segments to the same function calculated for the particular word set pair in the second set of content segments.

16. The method of claim 15, wherein the particular word set pmr comprises a particular key word set, wherein calculating the function for the particular word set pair in a particular content segment comprises:

comparing a number of occurrences of the particular word set pair in the particular set of content segments to a number of occurrences of the particular key word set in the particular set of content segments; and comparing a number of content segments in the particular set of content segments in which the particular word set pair appears to a number of content segments in the particular set of content segments in which the particular key word set appears.

* * * * *